United States Patent
Kawamae et al.

(10) Patent No.: US 11,346,776 B2
(45) Date of Patent: May 31, 2022

(54) TERAHERTZ WAVE DETECTION DEVICE, TERAHERTZ WAVE DETECTION METHOD, AND TERAHERTZ WAVE DETECTION SYSTEM

(71) Applicant: MAXELL, LTD., Kyoto (JP)

(72) Inventors: Osamu Kawamae, Kyoto (JP); Yukinobu Tanaka, Tokyo (JP); Misako Kono, Tokyo (JP); Nobuhiro Shiramizu, Tokyo (JP); Masuo Oku, Kyoto (JP); Manabu Katsuki, Kyoto (JP); Megumi Kurachi, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/051,321

(22) PCT Filed: Jul. 20, 2018

(86) PCT No.: PCT/JP2018/027405
§ 371 (c)(1),
(2) Date: Oct. 28, 2020

(87) PCT Pub. No.: WO2020/017060
PCT Pub. Date: Jan. 23, 2020

(65) Prior Publication Data
US 2021/0318234 A1    Oct. 14, 2021

(51) Int. Cl.
*G01N 21/3581* (2014.01)
*G01N 21/3504* (2014.01)

(52) U.S. Cl.
CPC ..... *G01N 21/3581* (2013.01); *G01N 21/3504* (2013.01); *G01N 2201/0221* (2013.01); *G01N 2201/0222* (2013.01)

(58) Field of Classification Search
CPC .......... G01N 21/3581; G01N 21/3504; G01N 2201/0221; G01N 2201/0222
See application file for complete search history.

(56) References Cited

U.S. PATENT DOCUMENTS 5,789,750 A * 8/1998 Nuss .......................... G01J 3/42
250/330
2006/0238741 A1 10/2006 Ninomiya et al.
(Continued)

FOREIGN PATENT DOCUMENTS

JP      10-104171 A      4/1998
JP   2000-346796 A   12/2000
(Continued)

OTHER PUBLICATIONS

T. Yasui et al., "Gapless THZ Comb Spectroscopy", The Review of Laser Engineering, Sep. 2014, vol. 42, No. 9, pp. 1-6.
(Continued)

*Primary Examiner* — David P Porta
*Assistant Examiner* — Meenakshi S Sahu
(74) *Attorney, Agent, or Firm* — McDermott Will & Emery LLP

(57) ABSTRACT

Terahertz wave detection equipment comprises: a terahertz wave transceiver including a transmitter for transmitting a terahertz wave and a receiver for receiving a reflected terahertz wave reflected by a background reflected object which exists behind an object to be analyzed; a display; and an information processing apparatus, wherein the transmitter irradiates a terahertz wave based on a transmission signal including a specific frequency toward a two-dimensional area including the object to be analyzed, and the information processing apparatus is configured to analyze concentration of the object to be analyzed based on the reflected terahertz wave and generate a composite image in which a concentration image of the object to be analyzed is combined with an image of the background reflected object.

13 Claims, 17 Drawing Sheets

(56) References Cited

U.S. PATENT DOCUMENTS

| | | | |
|---|---|---|---|
| 2010/0025585 A1 | 2/2010 | Taguchi et al. | |
| 2010/0110447 A1* | 5/2010 | Cox | G01N 21/3504 |
| | | | 356/519 |
| 2016/0178593 A1 | 6/2016 | Miller et al. | |
| 2018/0284015 A1* | 10/2018 | Imade | G01N 21/27 |
| 2020/0041406 A1 | 2/2020 | Asano | |

FOREIGN PATENT DOCUMENTS

| | | |
|---|---|---|
| JP | 2008-026190 A | 2/2008 |
| JP | 2009-060162 A | 3/2009 |
| JP | 2011-180568 A | 9/2011 |
| WO | 2004/079350 A1 | 9/2004 |
| WO | 2008/081757 A1 | 7/2008 |
| WO | 2015/034844 A1 | 3/2015 |
| WO | 2016/181854 A1 | 11/2016 |
| WO | 2017/213075 A1 | 12/2017 |
| WO | 2018/034236 A1 | 2/2018 |
| WO | 2018/038149 A1 | 3/2018 |
| WO | 2018/038152 A1 | 3/2018 |

OTHER PUBLICATIONS

International Search Report issued in corresponding International Patent Application No. PCT/JP2018/027405, dated Oct. 16, 2018, with English translation.

* cited by examiner

| PARAMETER | TIME t0 (Previous) | TIME t1 (Current) | TEMPORAL CHANGE EVALUATION VALUE |
|---|---|---|---|
| PEAK COORDINATES | (X0, Y0) | (X1, Y1) | $R=\sqrt{(X1-X0)^2+(Y1-y0)^2}$ $\varphi=\arctan(Y1-Y0)/(X1-X0)$ |
| PEAK CONCENTRATION | D00 | D10 | D10 |
| Sx- | S00 | S10 | S10-S00 |
| Sx+ | S01 | S11 | S11-S01 |
| SY- | S02 | S12 | S12-S02 |
| SY+ | S03 | S13 | S13-S03 |
| SU- | S04 | S14 | S14-S04 |
| SU+ | S05 | S15 | S15-S05 |
| SV- | S06 | S16 | S16-S06 |
| SV+ | S07 | S17 | S17-S07 |

COMPOSITE DISPLAY IMAGE 553

TERAHERTZ WAVE DETECTION DEVICE, TERAHERTZ WAVE DETECTION METHOD, AND TERAHERTZ WAVE DETECTION SYSTEM

CROSS REFERENCE TO RELATED APPLICATIONS

This application is the U.S. National Phase under 35 U.S.C. § 371 of International Application No. PCT/JP2018/027405, filed on Jul. 20, 2018, the entire contents is hereby incorporated by reference.

TECHNICAL FIELD

The present invention relates to terahertz wave detection equipment, a terahertz wave detection method, and a terahertz wave detection system.

BACKGROUND ART

It has been known that a plurality of types of VCO gas shows a characteristic frequency absorption spectrum in a region of a terahertz wave (0.1 THz to 10 THz, hereinafter referred to as "THz wave"). It has been also known that the THz wave has a longer wavelength than infrared light, and thus is less susceptible to influence of aerosol. Non-Patent Literature 1 discloses investigation for applying a THz wave to analysis of VCO gas by using property of the THz wave.

CITATION LIST

Patent Literature

Non-Patent Literature: Gapless THz Comb Spectroscopy (The Review of Laser Engineering, Vol. 42, No. 9, pp. 1 to 6, September, 2014)

SUMMARY OF INVENTION

Technical Problem

Non-Patent Literature 1 mentions generation of a terahertz wave without a gap between spectrums, however, does not teach display of a result which is obtained by the analysis using the THz wave. Since a terahertz wave has a longer wavelength than light, resolution of an image of the received terahertz wave cannot be the same level as that of a visible light image. Accordingly, improvement is necessary for providing a result of the analysis using the THz wave as an image.

The present invention has been made in view of the circumstances described above, and an object of the present invention is to provide display technique capable of making it easy to see an analysis result using a terahertz wave.

Solution to Problem

In order to solve the problems described above, the present invention provides terahertz wave detection equipment comprising: a terahertz wave transceiver including a transmitter configured to transmit a terahertz wave, and a receiver configured to receive a reflected terahertz wave reflected by a background reflected object which exists behind an object to be analyzed; a display; and an information processing apparatus connected to each of the terahertz wave transceiver and the display, wherein the transmitter irradiates a terahertz wave based on a transmission signal including a specific frequency toward a two-dimensional area including the object to be analyzed, and the information processing apparatus includes: an analysis unit configured to analyze concentration of the object to be analyzed based on the reflected terahertz wave; and a visualization unit configured to generate a composite image in which a concentration image of the object to be analyzed is combined with a background image of the background reflected object based on an analysis result of the analysis unit, and display the composite image on the display.

Advantageous Effects of Invention

According to the present invention, it is possible to provide display technique capable of making it easy to see an analysis result using a terahertz wave. The objects, configurations, and effects other than those described above will be clarified by explanation of the embodiments below.

DESCRIPTION OF EMBODIMENTS

Hereinafter, embodiments of the present invention will be described with reference to the drawings. The components and processing steps which are common in the embodiments are provided with the same reference signs, and repetitive explanation thereof will be omitted.

First Embodiment

Figure 1A:
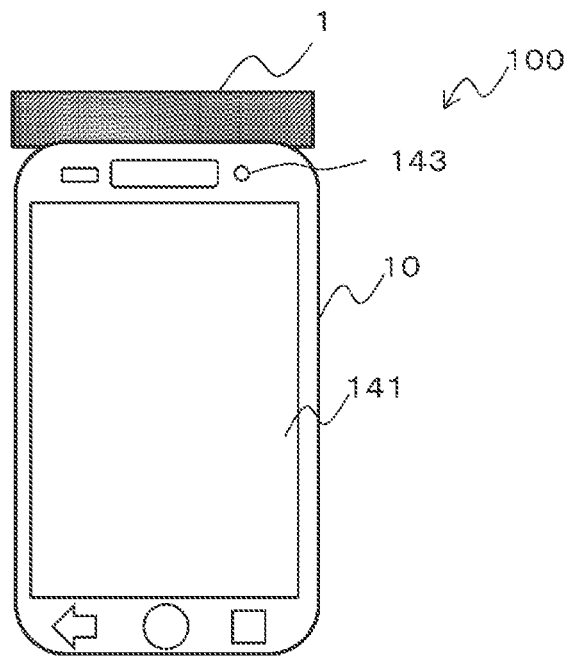
FIG. 1A is a front view of THz wave detection equipment according to a first embodiment.
Figure 1B:
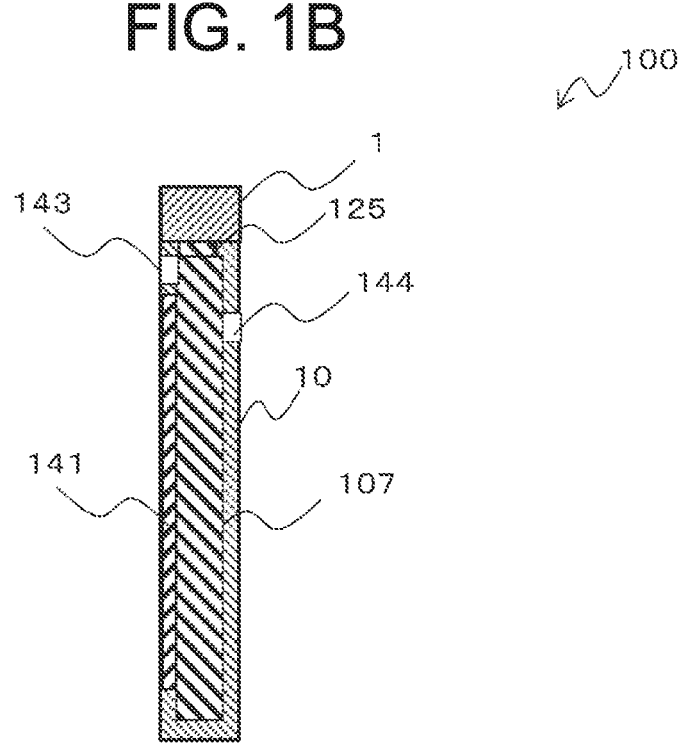
FIG. 1B is a side cross-sectional view of THz wave detection equipment according to the first embodiment.
Figure 2:
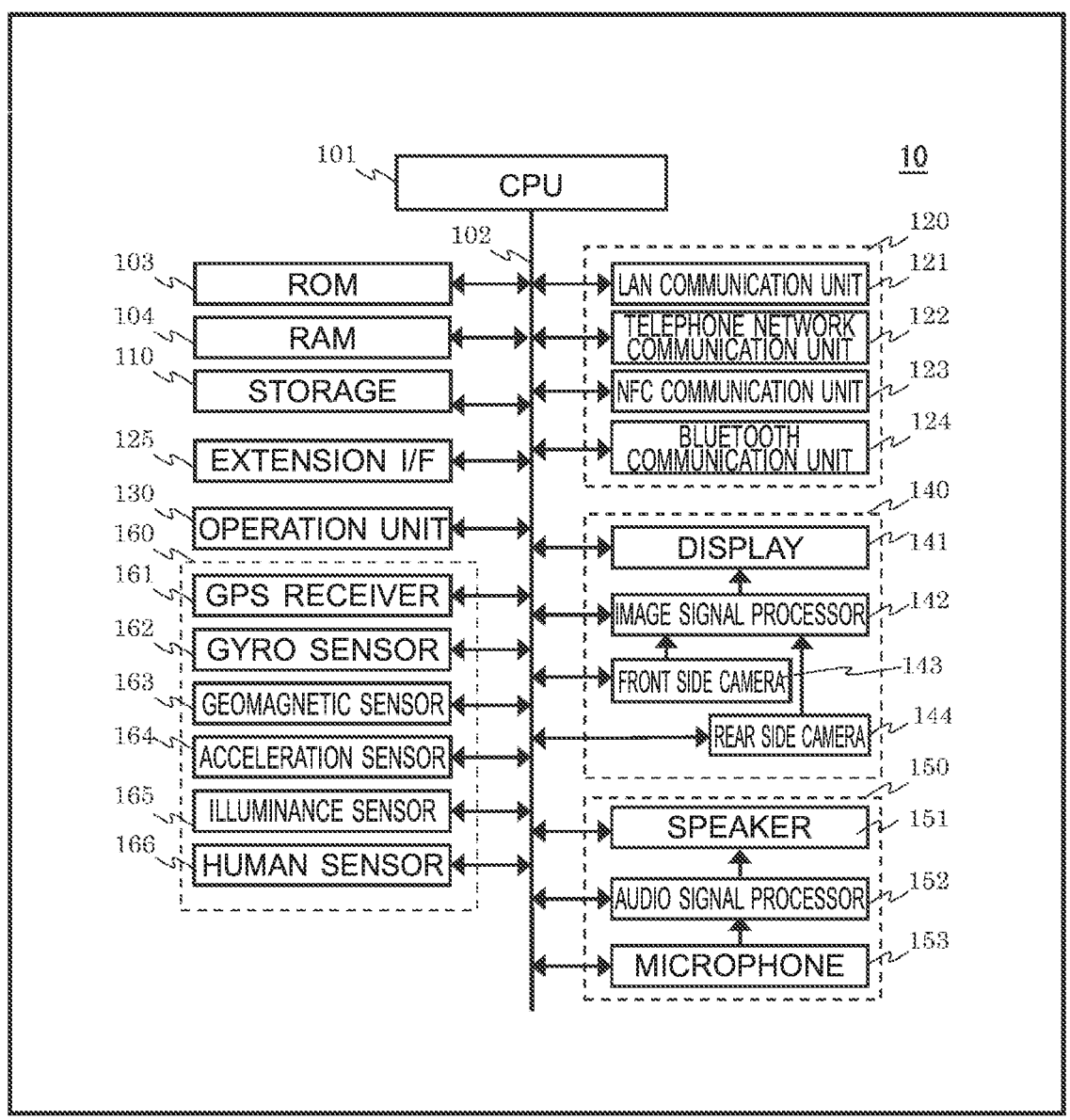
FIG. 2 is a hardware configuration diagram of THz wave detection equipment according to the first embodiment.

In a first embodiment, an example in which THz wave detection equipment 100 is applied to a gas visualization system will be described. FIG. 1A is a front view of THz wave detection equipment according to the first embodiment. FIG. 1B is a side cross-sectional view of the THz wave detection equipment according to the first embodiment. FIG. 2 is a hardware configuration diagram of the THz wave detection equipment according to the first embodiment.

The THz wave detection equipment 100 illustrated in FIG. 1A is configured by externally attaching a THz wave transceiver 1 to a smartphone 10 as an information processing apparatus. The information processing apparatus may be other mobile information terminals, for example, a tablet terminal. The THz wave detection equipment 100 may be configured by connecting the THz wave transceiver 1 to a computer.

As illustrated in FIG. 1B, the smartphone 10 includes an extension I/F 125. The THz wave transceiver 1 is connected to the extension I/F 125.

The smartphone 10 includes a display 141 and a front side camera 143 on a front surface thereof. The smartphone 10 further includes a rear side camera 144 on a rear surface thereof. The smartphone 10 accommodates a processor 107 inside a housing thereof.

FIG. 2 is a block diagram illustrating an example of an internal configuration of the smartphone 10. In FIG. 2, the smartphone 10 includes a CPU (Central Processing Unit) 101, a system bus 102, a ROM (Read Only Memory) 103, a RAM (Random Access Memory) 104, a storage 110, a communication processing unit 120, the extension interface 125, an operation unit 130, a video processor 140, an audio processor 150, and a sensor 160.

The CPU 101 is a microprocessor unit configured to control the entire of the smartphone 10. The system bus 102 is a data communication channel for transmitting and receiving data between the CPU 101 and each operation block in the smartphone 10.

The ROM 103 is a memory in which a basic operation program such as an operating system and other operation programs are stored. As the ROM 103, for example, a rewritable ROM such as an EEPROM (Electrically Erasable and Programmable Read Only Memory) or a flash ROM is used. The RAM 104 is a work area at the time of execution of the basic operation program and other operation programs. The ROM 103 and the RAM 104 may be configured to be integrated with the CPU 101. Furthermore, the ROM 103 may use a part of a storage area in the storage 110 instead of configuring it independently as illustrated in FIG. 2. The processor 107 is configured by connecting the CPU 101, the ROM 103, the RAM 104 and the storage 110 via the system bus 102.

The storage 110 stores such as operation programs and operation setting values of the smartphone 10, images captured by the smartphone 10, and information of the user of the smartphone 10.

Some or all of the functions of the ROM 103 may be substituted with a partial area of the storage 110. The storage 110 needs to hold stored information even when the smartphone 10 is not supplied with power from the outside. Thus, for example, a device such as a flash ROM, an SSD (Solid State Drive), or an HDD (Hard Disk Drive) is used.

Each of the operation programs stored in the ROM 103 or the storage 110 can be updated and the functions thereof can be extended by performing download processing from each server device (not illustrated) on the wide area public network.

The communication processing unit 120 includes a LAN (Local Area Network) communication unit 121, a telephone network communication unit 122, an NFC (Near Field Communication) communication unit 123, and a Bluetooth (registered trademark) communication unit 124. The LAN communication unit 121 is connected to the wide area public network through an access point (AP) device (not illustrated) by wireless connection using Wi-Fi (registered trademark) etc., to transmit and receive data to and from each server device on the wide area public network. The telephone network communication unit 122 performs telephone communication (telephone call) and transmits and receives data by wireless communication with a base station (not illustrated) of the mobile telephone communication network. The NFC communication unit 123 performs wireless communication when coming close to the corresponding reader and writer. The Bluetooth communication unit 124 transmits and receives data with the corresponding terminal by wireless communication. Here, it is assumed that each of the LAN communication unit 121, the telephone network communication unit 122, the NFC communication unit 123, and the Bluetooth communication unit 124 includes an encoding circuit, a decoding circuit, an antenna, etc. The communication processing unit 120 may further include other communication units such as an infrared communication unit.

The extension interface 125 is a group of interfaces for extending the functions of the smartphone 10. In the present embodiment, it is assumed that the extension interface 125 is configured by a video interface, an audio interface, a USB (Universal Serial Bus) interface, a m s memory interface, etc. The video interface performs input of video signals from an external video output device, and output of video signals to the external video input device. The audio interface performs input of audio signals from an external audio output device, and output of audio signals to the external audio input device. The USB interface is connected to such as a PC (Personal Computer) to transmit and receive data. The USB interface may be used for connection of a keyboard or other USB devices. The memory interface is used for connection of a memory card and/or other memory media to transmit and receive data.

The operation unit 130 is an instruction input device for inputting an operation instruction to the smartphone 10. In the present embodiment, it is assumed that the operation unit 130 is configured by an operation key in which a touch screen and a button switch placed upon the display 141 are arranged. In this connection, the operation key may include only one of the touch screen and the button switch, and moreover, the smartphone 10 may be operated by using a keyboard or the like connected to the extension interface 125. Alternatively, the smartphone 10 may be operated by using another mobile terminal device connected thereto by wired communication or wireless communication. Still further, the function included in the display 141 may be used instead of the function of the touch screen.

The video processor 140 includes the display 141, an image signal processor 142, the front side camera 143, and the rear side camera 144. The front side camera 143 is a camera disposed on a surface (front surface) on which the display 141 is also disposed. The front side camera 143 is used for, for example, a so-called self-photographing which allows the user to capture an image of his or her face by the front side camera 143 while checking it on the display 141. The rear side camera 144 is a camera disposed on the opposite side (back surface) of the display 141.

The display 141 is a display device such as a liquid crystal panel. The display 141 displays image data which has been processed by the image signal processor 142 to provide the user of the smartphone 10 with the image data. The image signal processor 142 includes a video RAM (not illustrated), and the display 141 is driven based on the image data input to the video RAM. The image signal processor 142 has functions of converting formats, superimposing menus and other OSD (On-Screen Display) signals, and so on. The front side camera 143 and the rear side camera 144 correspond to a camera unit which functions as an image capture device configured to convert light input from a lens by using an electronic device such as a CCD (Charge-Coupled Device) or a CMOS (Complementary Metal Oxide Semiconductor) sensor into an electric signal so as to input image data of the surrounding and an object.

The audio processor 150 includes a speaker 151, an audio signal processor 152, and a microphone 153. The speaker 151 provides the user of the smartphone 10 with an audio signal which has been processed by the audio signal processor 152. The microphone 153 converts such as the voice of the user into voice data to input the voice data.

The sensor 160 is a group of sensors for detecting a state of the smartphone 10. In the present embodiment, the sensor 160 includes a GPS (Global Positioning System) receiver 161, a gyro sensor 162, a geomagnetic sensor 163, an acceleration sensor 164, an illuminance sensor 165, and a human sensor 166. With the group of sensors above, it is possible to detect such as the position, inclination, direction, movement, and peripheral brightness of the smartphone 10. The smartphone 10 may further include other pressure sensors such as a barometric pressure sensor. The position information is acquired by the GPS receiver 161. Meanwhile, when the position information cannot be acquired such as in a place where GPS radio waves are difficult to be received, it may be acquired based on the position information of the AP device of Wi-Fi through the LAN communication unit 121, or may be acquired based on the base station information through the telephone network communication unit 122.

The configuration example of the smartphone 10 illustrated in FIG. 2 includes components which are not necessarily required in the present embodiment, such as the communication processing unit 120. Even if these components are not included, the advantageous effects of the present embodiment will not be impaired. In addition, other components which are not illustrated herein, such as a digital broadcast reception function and an electronic money settlement function, may be further included.

Figure 3:
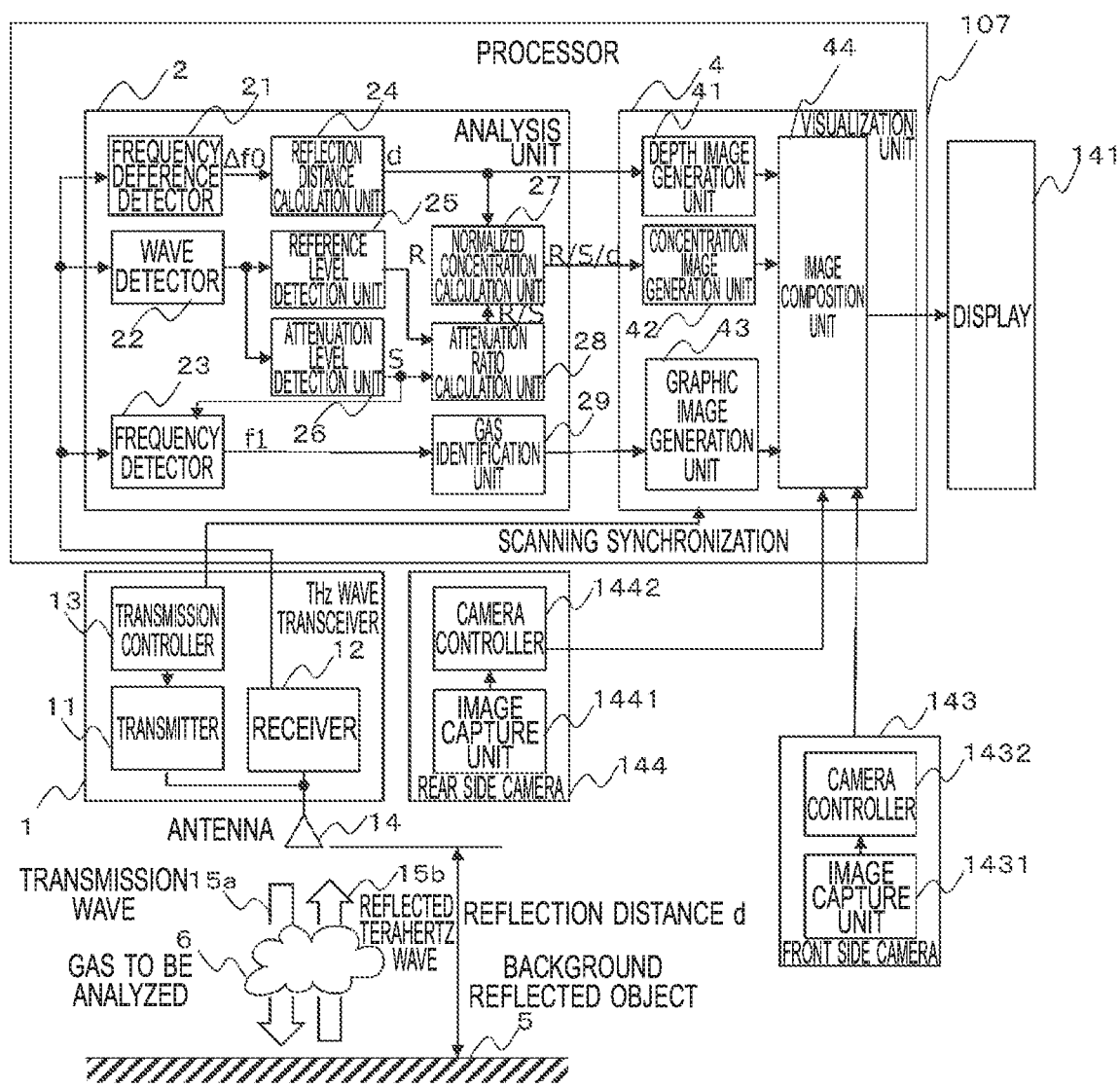
FIG. 3 is a functional block diagram of THz wave detection equipment according to the first embodiment.

FIG. 3 is a functional block diagram of the THz wave detection equipment 100 according to the first embodiment. In the THz wave detection equipment 100, the THz wave transceiver 1 and the rear side camera 144 are connected to an input stage of the processor 107, and the display 141 is connected to an output stage of the processor 107.

The processor 107 mainly includes an analysis unit 2 and a visualization unit 4. The analysis unit 2 and the visualization unit 4 are configured by executing software that realizes the functions of the THz wave detection equipment 100 by means of hardware included the processor 107.

The THz wave transceiver 1 includes a transmitter 11, a receiver 12, a transmission controller 13, and an antenna 14.

The THz wave transceiver 1 irradiates a transmission wave 15*a* toward a three-dimensional space including gas 6 to be analyzed from the antenna 14 attached to the THz wave transceiver 1. The gas 6 to be analyzed absorbs a specific frequency spectrum. Then, the antenna 14 receives a reflected terahertz wave 15*b* which has been reflected by a background reflected object 5 and passed through the gas 6 to be analyzed.

The transmission controller 13 controls the transmitter 11 to output a THz wave (transmission signal) in which the frequency of the spectrum is swept. The transmitter 11 converts the transmission signal into the transmission wave 15*a* (THz wave), and irradiates the transmission wave 15*a* toward a two-dimensional area including the gas 6 to be analyzed from the antenna 14. The receiver 12 acquires the reflected terahertz wave 15*b* which has been received by the antenna 14, and converts it to a reception signal and transmits the reception signal to the analysis unit 2.

The irradiation of the transmission wave 15*a* to the two-dimensional area is performed by scanning an irradiation direction horizontally or vertically in a unit of a period for sweeping the frequency of the spectrum. As a means of scanning the irradiation direction, a mechanical means using such as a galvano mirror may be employed, or an electrical means using a phased array antenna in which a plurality of antenna elements is arranged in an array so as to make phases of THz wave signals to be inputted to each antenna element different may be employed. A synchronous signal of scanning is shared with the visualization unit 4.

The analysis unit 2 includes a frequency deference detector 21, a wave detector 22, a frequency detector 23, a reflection distance calculation unit 24, a reference level detection unit 25, an attenuation level detection unit 26, a normalized concentration calculation unit 27, an attenuation ratio calculation unit 28, and a gas identification unit 29.

The visualization unit 4 includes a depth image generation unit 41, a concentration image generation unit 42, a graphic image generation unit 43, and an image composition unit 44.

The frequency deference detector 21 is configured to acquire a frequency difference $\Delta f0$ between the transmission signal and the reception signal based on an interference signal therebetween, and output the acquired frequency difference $\Delta f0$ to the reflection distance calculation unit 24.

The reflection distance calculation unit 24 is configured to calculate a reflection distance d between the antenna 14 and the background reflected object 5 based on the frequency difference $\Delta f0$, and output the calculated reflection distance d to each of the normalized concentration calculation unit 27 and the depth image generation unit 41.

The wave detector 22 is configured to detect an envelope of the reception signal, and output the detected envelope to each of the reference level detection unit 25 and the attenuation level detection unit 26.

The reference level detection unit 25 is configured to detect, based on the envelope of the reception signal, a reference level R in a frequency range in which the gas 6 to be analyzed does not absorb the spectrum of the THz wave.

The reference level detection unit 25 outputs the detected reference level R to the attenuation ratio calculation unit 28.

The attenuation level detection unit 26 is configured to detect, based on the envelope of the reception signal, a recess of the envelope at a specific frequency in which the gas 6 to be analyzed absorbs the spectrum so as to detect an attenuation level S based on an amount of the recess. The attenuation level detection unit 26 outputs the detected attenuation level S to the attenuation ratio calculation unit 28.

The attenuation level detection unit 26 is configured to output a timing at which the recess is generated to the frequency detector 23. The frequency detector 23 is configured to detect a frequency f1 of the reception signal in which the recess is generated, and output the detected frequency f1 to the gas identification unit 29.

The gas identification unit 29 is configured to identify a type of gas of which frequency of the absorption spectrum is f1, and output the identified type to the graphic image generation unit 43.

The attenuation ratio calculation unit 28 is configured to calculate an attenuation ratio R/S based on the reference level R and the attenuation level S, and output the calculated attenuation ratio R/S to the normalized concentration calculation unit 27.

The normalized concentration calculation unit 27 is configured to calculate a normalized concentration R/S/d obtained by dividing the attenuation ratio R/S by the reflection distance d. The normalized concentration calculation unit 27 outputs the normalized concentration R/S/d to the concentration image generation unit 42.

The rear side camera 144 includes an image capture unit 1441 and a camera controller 1442. The image capture unit 1441 includes an image capture device such as a CMOS sensor, and an image capture lens. The image capture unit 1441 is configured to capture a visible light image or an infrared light image in the two-dimensional area in which the THz wave is irradiated. The camera controller 1442 is configured to convert a signal from the image capture unit 1441 into an RGB signal. In this connection, a part of an image capture area may be configured to correspond to an irradiation area of the THz wave signal. In the same manner as the rear side camera 144, the front side camera 143 includes an image capture unit 1431 and a camera controller 1432. An embodiment using the front side camera 143 will be described later as a third embodiment.

Upon receipt of the reflection distance d, the depth image generation unit 41 is configure to convert the reflection distance d into a single color with variable intensity in accordance with an irradiation scanning synchronization of the THz wave, so as to generate a two-dimensional image.

Upon receipt of the normalized concentration R/S/d, the concentration image generation unit 42 is configured to convert the normalized concentration R/S/d into a single color with variable intensity or map it to a predetermined color in accordance with an irradiation scanning synchronization of the THz wave, so as to generate a two-dimensional image.

The graphic image generation unit 43 is configured to acquire text data as information of the type of gas, and further convert the text data into graphic image data so as to obtain a graphic image.

Upon receipt of the depth image, the concentration image, the graphic image, and further a camera image, the image composition unit 44 is configured to combine them so as to output a composite image to the display 141.

FIG. 4 explains an analysis method of gas and smell, which mainly relates to the THz wave transceiver 1 of FIG. 1 and the analysis unit 2.

Figure 4A:
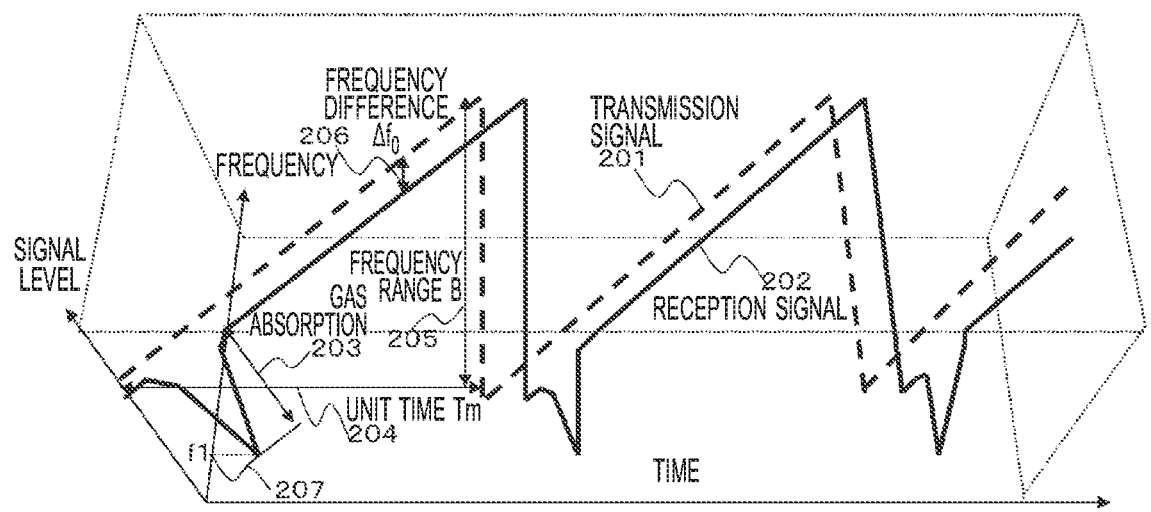
FIG. 4A explains a transmission signal and a reception signal of a THz wave.

FIG. 4A explains a transmission signal 201 and a reception signal 202 of a THz wave. The transmission wave 15a and the reflected terahertz wave 15b are in the relationship between being inside and outside of the antenna 14, respectively. FIG. 4A illustrates the transmission signal 201 and the reception signal 202 with respect to three axes, i.e., time, signal level, and frequency.

The transmission signal 201 illustrated by a broken line performs a sweep operation for gradually changing the frequency in a THz wave region in a unit time Tm while keeping the signal level constant. A frequency range in the sweep operation is indicated by B. After completing the sweep operation in one unit, the transmission signal 201 performs a next sweep operation while making an irradiation location different from that of the previous operation in accordance with scanning of the irradiation described above.

The reception signal 202 illustrated by a solid line is slightly delayed relative to the transmission signal 201 since the reception signal 202 reciprocates the reflection distance d. Due to this delay, when they are observed at the same time, the frequency difference Δf0 exists between the transmission signal 201 and the reception signal 202. The signal level of the reception signal 202 is recessed at the specific frequency f1. This is because the gas 6 to be analyzed absorbs spectrum at the frequency f1.

Figure 4B:
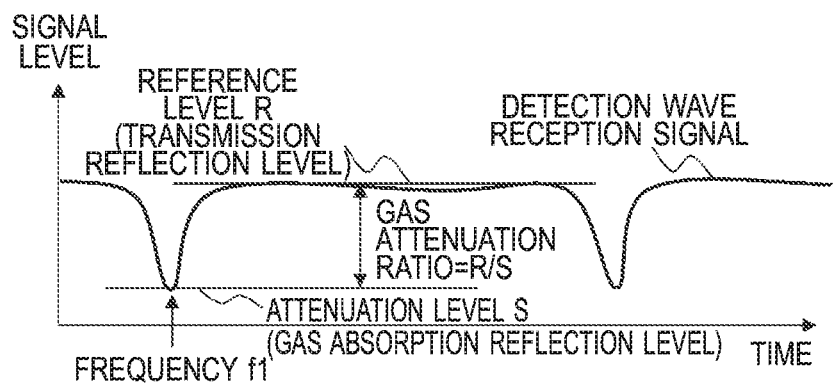
FIG. 4B illustrates a signal level of a reception signal.

FIG. 4B illustrates the signal level of the reception signal 202. As explained in FIG. 4B, the signal level is recessed at the frequency f1. The reference level R is a signal level at the time without absorption by gas, and can be obtained by sampling a plurality of points in flat portions excluding a recessed portion and by averaging them. The signal level S of the recessed portion is a signal level attenuated by gas absorption, and represents a level of gas absorption. The higher the gas concentration is, the greater the attenuation is and the smaller the attenuation level S becomes. The attenuation ratio due to gas absorption is indicated by R/S.

The reflection distance calculation unit 24 calculates the reflection distance d by Equation (1) below.

[Equation 1]

$$d = \frac{cT_m}{2B}\Delta f_0 \qquad (1)$$

d: Reflection distance
C: speed of light

The normalized concentration calculation unit 27 calculates a normalized gas concentration (also referred to as a normalized concentration) by Equation (2) below.

[Equation 2]

$$\text{Normalized gas concentration} = R/S/d \qquad (2)$$

Figure 5:
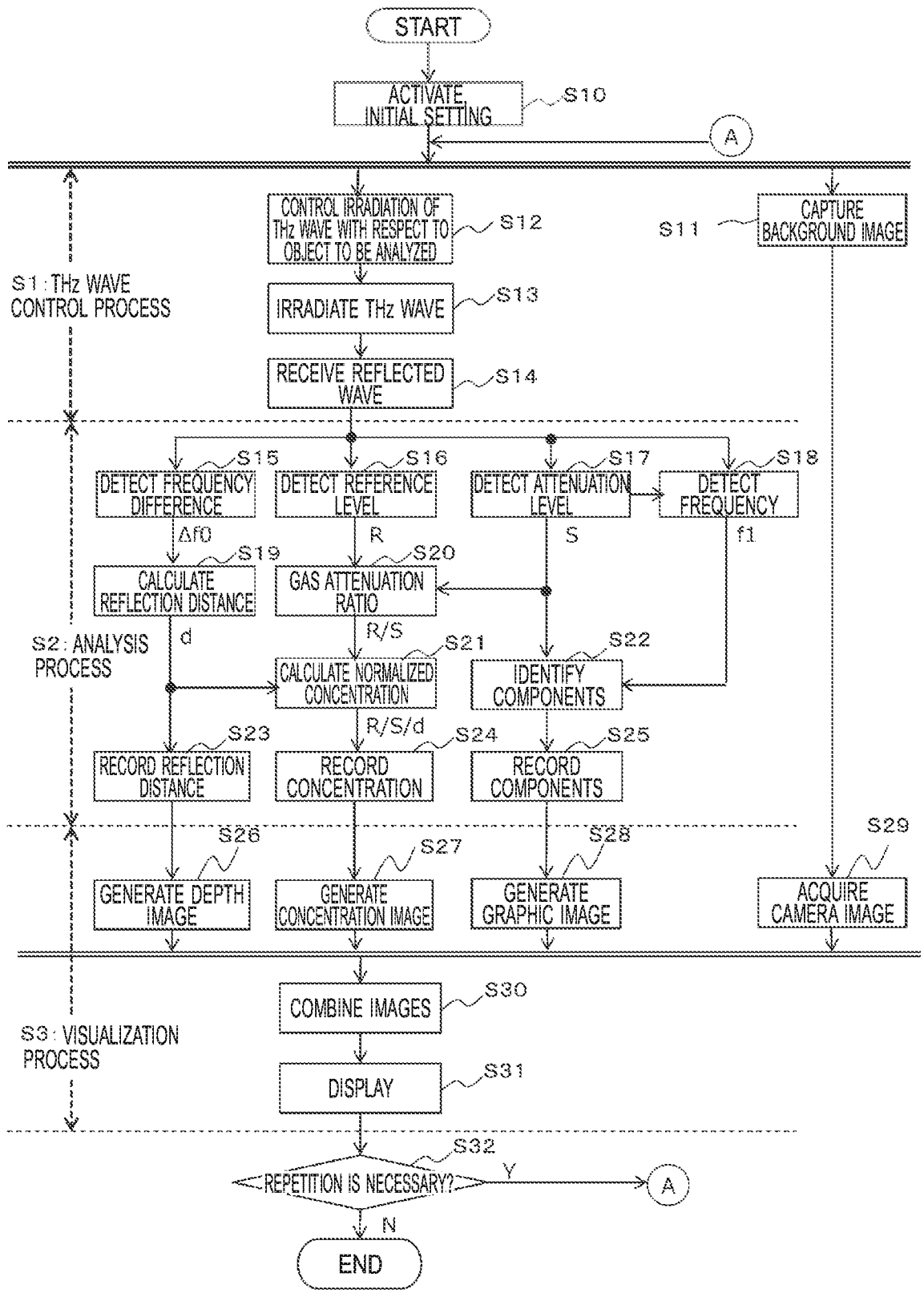
FIG. 5 illustrates a flowchart of an operation flow of THz wave detection equipment.

FIG. 5 illustrates a flowchart of an operation flow of the THz wave detection equipment 100.

After being activated, the THz wave detection equipment 100 performs initial settings (step S10). The THz wave detection equipment 100 performs image capture processing by the rear side camera 144 (step S11) and measurement by the THz wave transceiver 1 in parallel. The measurement by the THz wave transceiver 1 includes a series of processing steps, i.e., irradiation control of a THz wave with respect to an object to be analyzed (in the present embodiment, the entire area including the gas to be analyzed) (step S12), irradiation of the THz wave (step S13), and reception of reflected terahertz wave (step S14). The steps from S12 to S14 are included in a THz wave control process S1, and in step S12, control for irradiating the THz wave toward an area to be irradiated is performed. For example, an irradiation level of the THz wave, a time unit for a sweep operation, and a frequency width are controlled therein. In step S13, execution of irradiation of the THz wave is instructed so as to obtain a detection signal of a reception signal, which is the reflected terahertz wave, in step S14.

After receiving the reflected terahertz wave (step S14), frequency difference detection processing (step S15) by the frequency deference detector 21, reference level detection processing (step S16) by the reference level detection unit 25, attenuation level detection processing (step S17) by the attenuation level detection unit 26, and frequency detection processing (step S18) by the frequency detector 23 are performed in parallel. The steps from S15 to S25 are included in an analysis process S2.

After the frequency difference detection process (step S15) is completed, the reflection distance calculation unit 24 calculates the reflection distance d (step S19) and records the calculated reflection distance d in the RAM 104 or the storage 110 (step S23). Then, the reflection distance calculation unit 24 outputs the reflection distance d to the depth image generation unit 41, and the depth image generation unit 41 generates a depth image 51 (see FIG. 6) (step S26).

After the reference level detection processing (step S16) is completed, the attenuation ratio calculation unit 28 calculates the gas attenuation rate R/S (step S20). Next, the normalized concentration calculation unit 27 performs normalized concentration calculation processing (step S21), and records the normalized gas concentration in the RAM 104 or the storage 110 (step S24). Then, the normalized concentration calculation unit 27 outputs the normalized concentration R/S/d to the concentration image generation unit 42, and the concentration image generation unit 42 generates a concentration image 52 (see FIG. 6) (step S27)

After the attenuation level detection processing (step S17) is completed, the frequency detector 23 detects the recessed (attenuated) frequency f1 (step S18). Based on the detected frequency f1, the gas identification unit 29 specifies the type of gas, i.e., identifies components of the gas (step S22), and records the identified components of the gas in the RAM 104 or the storage 110 (step S25). Then, the gas identification unit 29 outputs an identification result of the components as text data to the graphic image generation unit 43, and the graphic image generation unit 43 generates a graphic image 53 (see FIG. 6) (step S28).

The rear side camera 144 captures a background image (step S11) to acquire a camera image (step S29).

The image composition unit 44 acquires the depth image 51, the concentration image 52, the graphic image 53, and a camera image 54, combines these four images (step S30), and displays a composite image on the display 141 (step S31).

The CPU 101 determines whether a condition for determining whether repetition is necessary is satisfied (step S32). The condition above is, for example, whether scanning has been completed or whether the application software should be continued. When the CPU 101 determines that the repetition is necessary (step S32/Yes), the processing returns to step S11 and step S12. When the CPU 101 determines that the repetition is not necessary (step S32/No), the processing is terminated.

Figure 6:
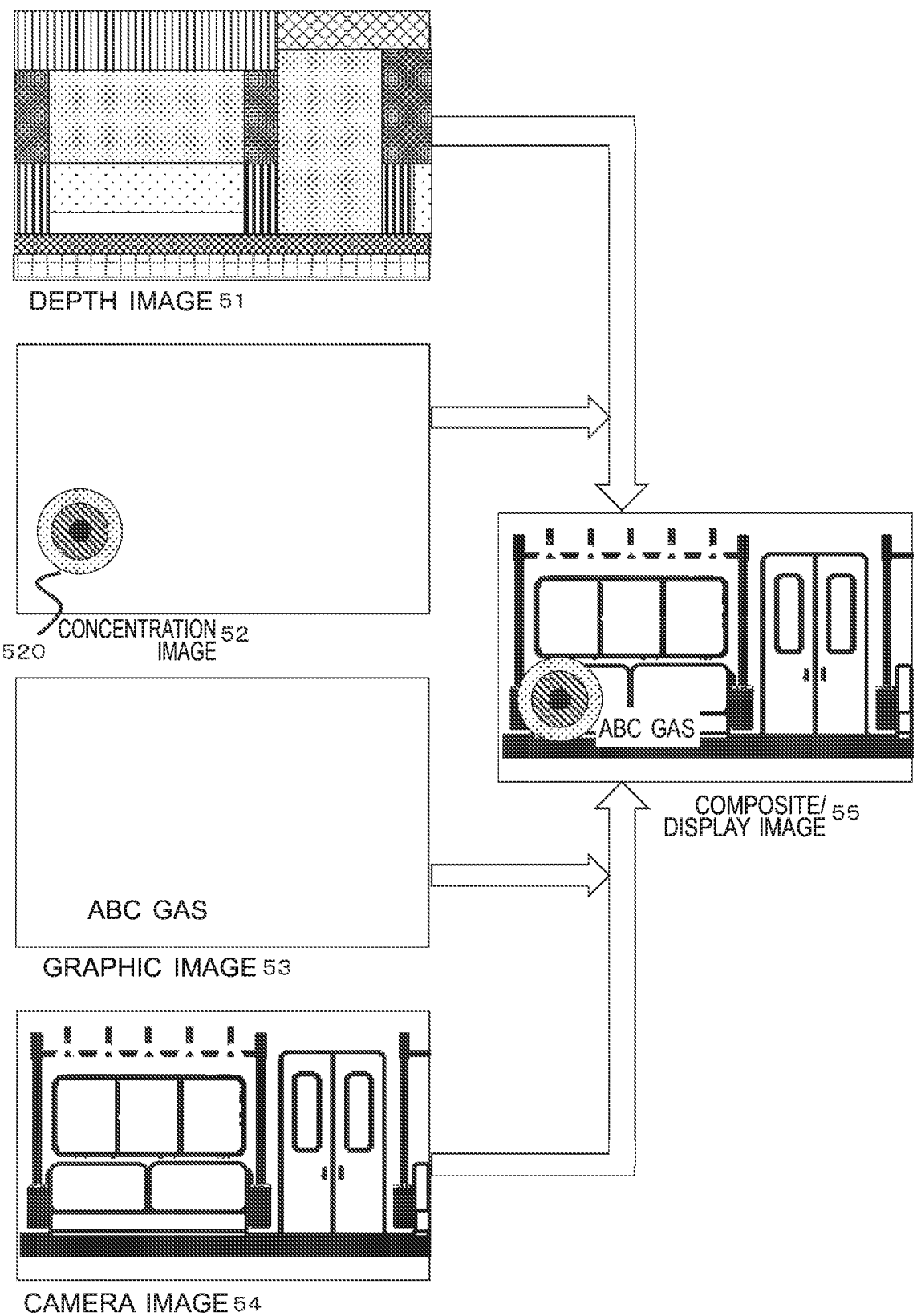
FIG. 6 explains a gas visualization method.

FIG. 6 explains a gas visualization method.

The depth image 51 is a two-dimensional image obtained, for example, by converting the reflection distance d into a single color with variable intensity in accordance with the irradiation scanning synchronization of the THz wave. Since the THz wave has a long wavelength relative to visible light, definition of the depth image 51 is inferior to that of the camera image captured by the visible light. The depth image 51 is obtained by visualizing the reflection distance d to the background reflected object, in which a background covered with aerosol, etc. can be observed. Accordingly, the depth image 51 together with the camera image 54 makes it easy to recognize such as an obstacle and an emergency exit for evacuation. A range corresponding to the relationship between a range for two-dimensionally scanning the THz wave and an angle of view of the camera image is detected and stored in advance.

The concentration image 52 of the gas is a two-dimensional image obtained, for example, by converting the normalized concentration R/S/d into a single color with variable intensity or by performing color mapping in accordance with the irradiation scanning synchronization of the THz wave in the same manner as the depth image 51. Since the gas concentration R/S is normalized by using the reflection distance d, it is possible to visualize danger of the gas in terms of concentration and distance.

The graphic image 53 is obtained by converting text data of the type of the gas into graphic image data. The graphic image 53 is useful since it may serve as an auxiliary image for visualizing such as, in addition to the type of gas, a warning message in accordance with the level of danger, temporal change of the gas, or both of them, in an easy-to-understand manner.

The camera image 54 is a camera image captured by the rear side camera 144. Since the camera image 54 is obtained by imaging the visible light reflected by the background reflected object 5, it is referred to as a background image.

A composite display image 55 is an image obtained by combining the depth image 51, the concentration image 52, the graphic image 53, and the camera image 54, which corresponds to an image to be displayed. The four images are four-layer images of a composite image, and by performing alpha blending as a composite method, a composite image that is easy to be visually recognized can be obtained. In this connection, the depth image 51 and the camera image 54 may be complementarily used. When the camera image 54 is unstable in an environment such as including aerosol, combining images may be performed to mainly display the depth image 51 or replace a part of the camera image 54 with the depth image 51. Furthermore, based on the camera image 54 and the depth image 51, combining images may be performed to display a feature portion such as an exit door, an obstacle on an evacuation route, or both of them which have been recognized from the camera image 54.

The image composition unit 44 acquires the depth image 51, the concentration image 52, the graphic image 53, and the camera image 54. Then, the image composition unit 44 compares the camera image 54 and the depth image 51 to acquire an object distance in the camera image 54. Next, the image composition unit 44 compares the concentration image 52 and the depth image 51 to determine whether gas 520 displayed in the concentration image 52 is in front of or behind the object in the camera image 54. In the composite display image 55 illustrated in FIG. 6, comparison of a distance from the THz wave detection equipment 100 to the seat in the depth image 51 with a distance from the THz wave detection equipment 100 to the gas 520 shows that the distance from the THz wave detection equipment 100 to the gas 520 is shorter than the other distance. Accordingly, the gas 520 is superimposed on the seat captured in the depth image 51 so as to be displayed in front of the seat.

Figure 7A:
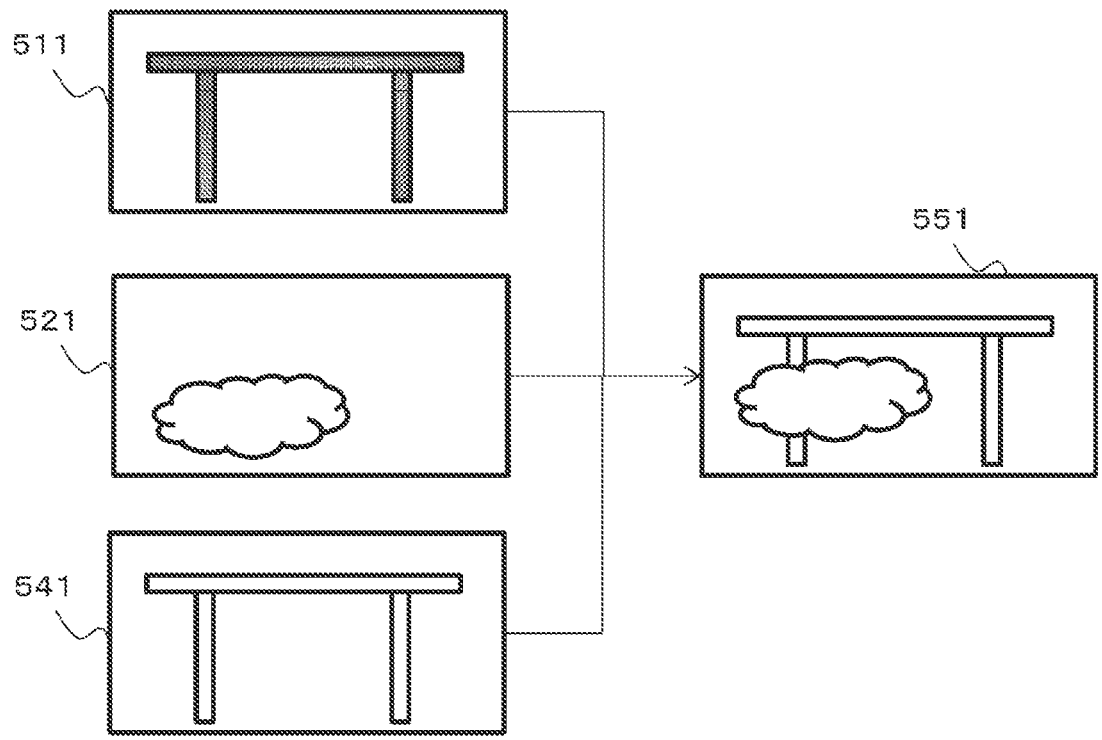
FIG. 7A illustrates an example of image composite processing.
Figure 7B:
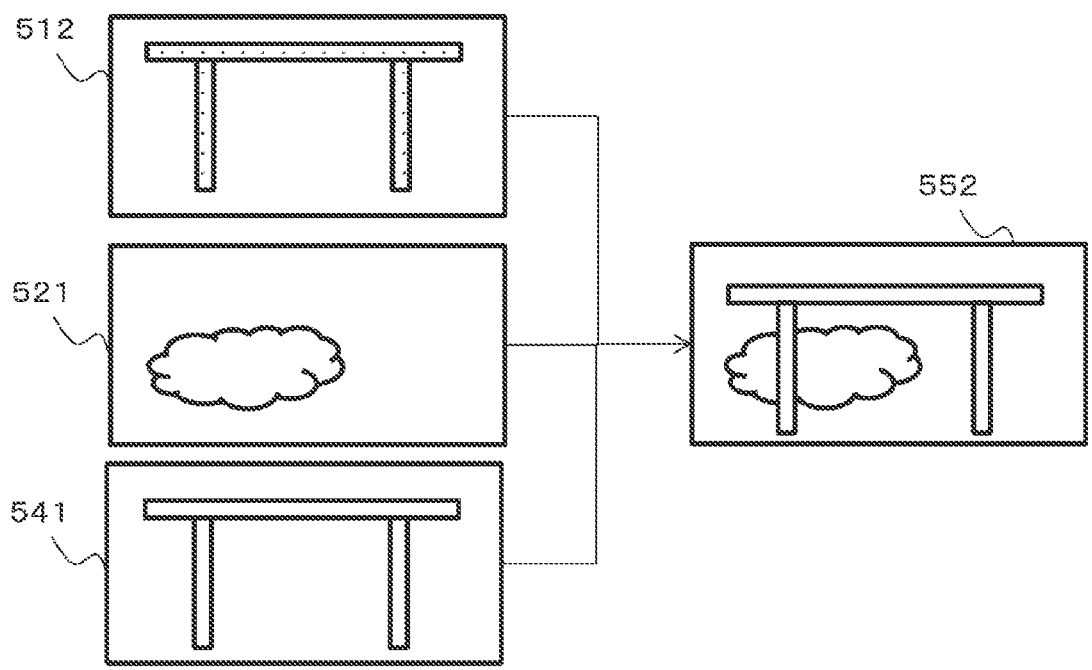
FIG. 7B illustrates an example of image composite processing.

FIG. 7A and FIG. 7B illustrate examples of image composite processing. A concentration image 521 and a camera image 541 illustrated in FIG. 7A are the same as those illustrated in FIG. 7B. On the other hand, a depth image 511 illustrated in FIG. 7A and a depth image 512 illustrated in FIG. 7B are different to each other. In the depth image 511, a table is located at a position farther from the THz wave detection equipment 100 than the gas while in the depth image 512, the table is located at a position closer from the THz wave detection equipment 100 than the gas. In the case of FIG. 7A, the image composition unit 44 generates a composite display image 551 in which the gas is displayed in front of the table. In the case of FIG. 7B, the image composition unit 44 generates a composite display image 552 in which the gas is displayed behind the table.

As described above, according to the first embodiment, since the concentration image 52 of the gas is superimposed on the background image which is obtained by the depth image 51 or the camera image 54, it is possible to visualize a position of the gas with respect to the background image. By using the camera image 54, a background image with high resolution can be obtained while in an environment such as including aerosol, the background can be confirmed by using the depth image 51, thereby making it possible to obtain the background image in various environments. Furthermore, the present embodiment can be utilized not only for analysis of gas but also for analysis performed at a place such as a kitchen where a bad smell may be generated.

Second Embodiment

Figure 8:
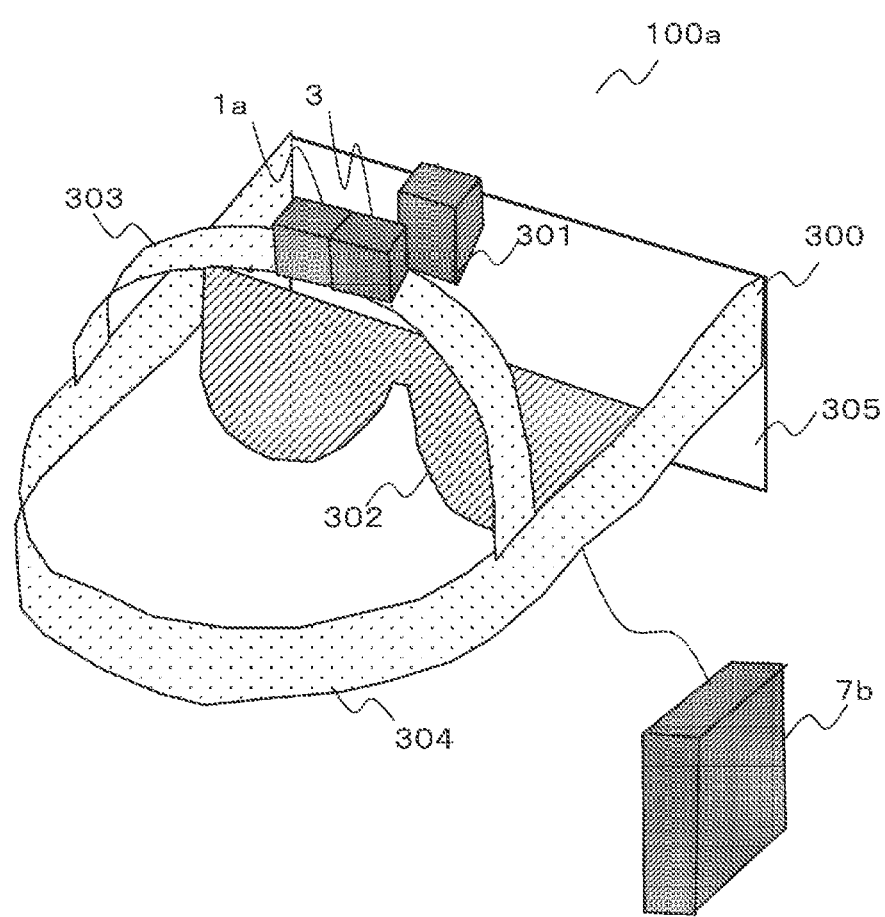
FIG. 8 illustrates appearance of THz wave detection equipment according to a second embodiment.
Figure 9:
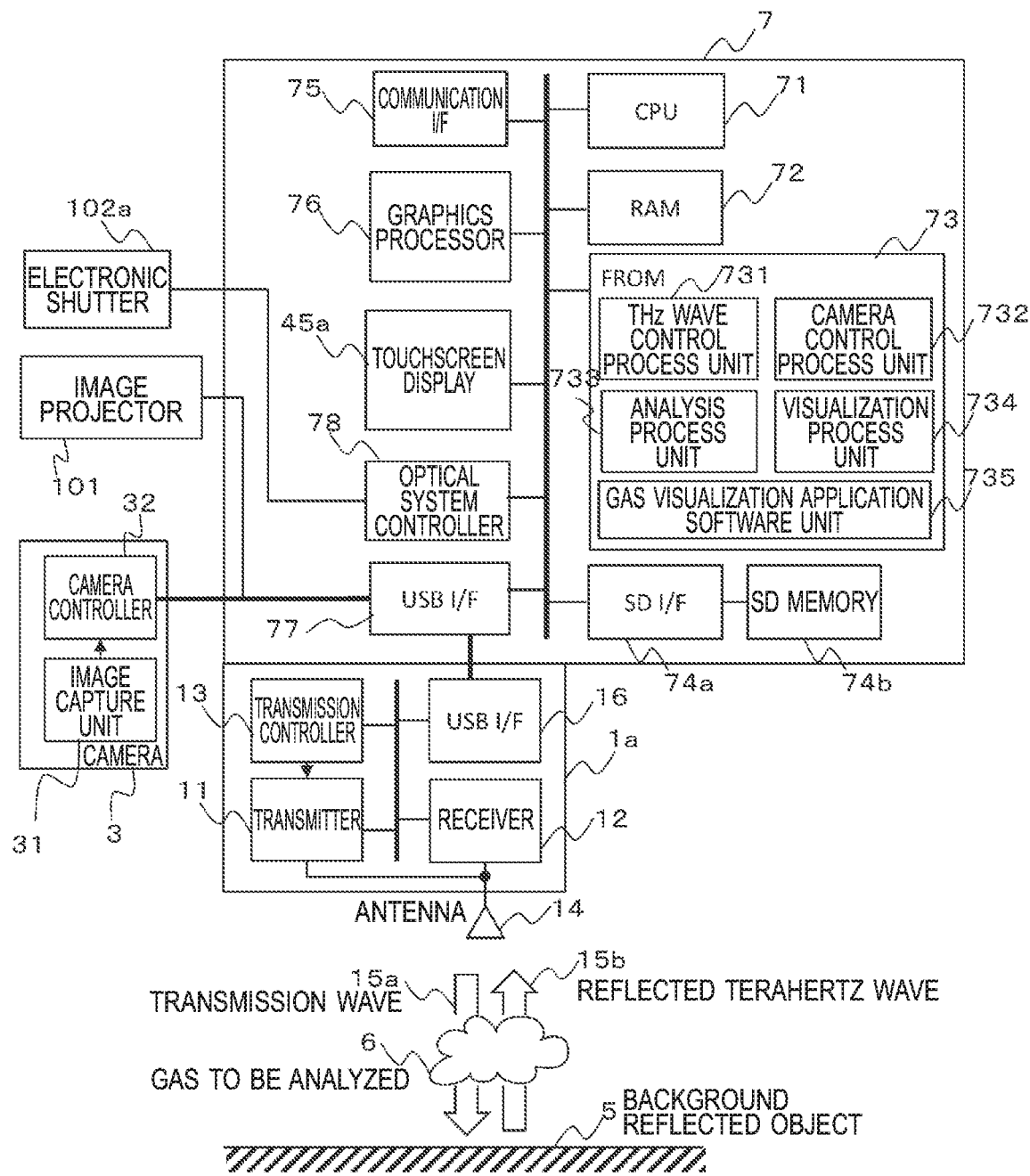
FIG. 9 is a functional block diagram of a controller.
Figure 10:
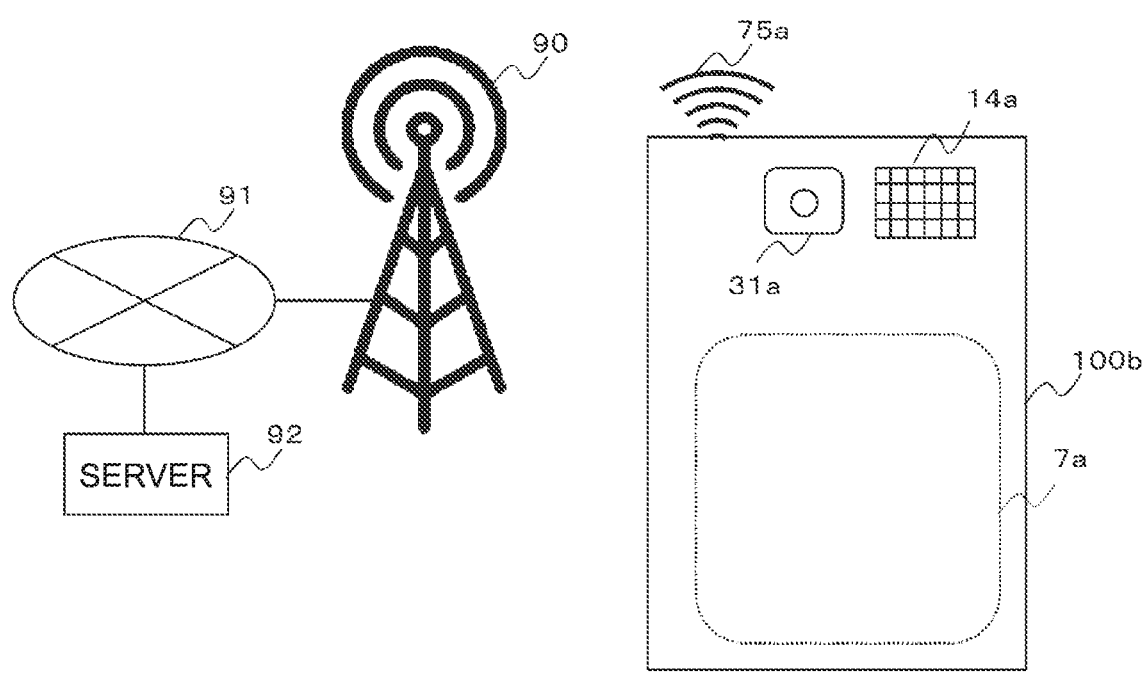
FIG. 10 illustrates an application example of THz wave detection equipment according to the second embodiment.

With reference to FIG. 8 to FIG. 10, the second embodiment will be described. The second embodiment shows an example of THz wave detection equipment 100a which is configured by attaching the THz wave transceiver 1 to a wearable terminal 300. The wearable terminal 300 may be integrated with the THz wave transceiver 1. A user can use the THz wave detection equipment 100a in a state in which it is attached to the body so that he or she can freely move both hands.

FIG. 8 illustrates appearance of the THz wave detection equipment 100a according to the second embodiment. As illustrated in FIG. 8, the THz wave detection equipment 100a is configured by attaching a THz wave transceiver 1a and a camera 3 to the wearable terminal 300.

The wearable terminal 300 includes a top head holder 303, a side head holder 304, an eyeglass optical unit 302 provided in front of the side head holder 304, a screen 305 provided further in front of the eyeglass optical unit 302, and an image projector 301 provided on the top head holder 303.

The THz wave transceiver 1a and the camera 3 are mounted, for example, on the top of the top head holder 303.

The THz wave detection equipment 100a further includes a controller 7b which is electrically or communicatively connected to the THz wave transceiver 1a, the cameras 3, the image projector 301, the eyeglass optical unit 302, and the screen 305.

The controller 7 has the functions of the smartphone 10, excluding the functions of the camera 3 and the display therefrom. The screen 305, the image projector 301, and the eyeglass optical unit 302 correspond to the display 141. The top head holder 303 and the side head holder 304 are used to mount the cameras 3, the THz wave transceiver 1a, and the display on the head of the user of the THz wave detection equipment 100a.

The image projector 301 projects the composite display image 55 onto the screen 305. At this time, the depth image 51 may be three-dimensionally displayed so as to give perspective in accordance with the reflection distance d. In this case, the composite display image 55 is composed of a visual image of the left eye and a visual image of the right eye. The eyeglass optical unit 302 incorporates an electronic shutter 102a (see FIG. 9) therein. When projecting the visual image of the left eye, the eyeglass optical unit 302 controls a left eye side to be in a transmissive state and a right eye side to be in a shielded state by the electronic shutter. When projecting the visual image of the right eye, the eyeglass optical unit 302 controls the right eye side to be in the transmission state and the left eye side to be in the shielded state by the electronic shutter.

The screen 305 may be a semi-transmissive screen. In this case, the camera image 54 is not included in the composite display image 55. A background image which can be seen through the semi-transmissive screen 305 is made to be visually recognized together with the composite display image 55 to be projected onto the semi-transmissive screen 305 by the image projector 301, which is composed of at least one of the depth image 51, the concentration image 52, and the graphic image 53. The camera image 54 is used for such as alignment when obtaining the composite display image 55. With this configuration, the user can safely use the THz wave detection equipment 100a while viewing an actual image of the background through the semi-transmissive screen 305.

FIG. 9 is a functional block diagram of the controller 7. The controller 7 includes a CPU 71, a RAM 72, a FROM 73, an SD I/F 74a, an SD memory 74b, a communication I/F 75, a graphic processor 76, a touchscreen display 45a, a USB(R) I/F 77, and an optical system controller 78. The USB(R) I/F 77 is connected to the THz wave transceiver 1a and the camera 3. The optical system controller 78 is connected to the electronic shutter 102a to control opening and closing of the electronic shutter 102a.

The THz wave transceiver 1a includes a USB I/F 16.

The controller expands a program stored in the FROM 73 on the RAM 72 to execute it on the CPU 71. The FROM 73 includes, as programs relating to analysis and visualization of gas and smell, a THz wave control process unit 731, a camera control process unit 732, an analysis process unit 733, a visualization process unit 734, and a gas visualization application software unit 735. Here, the THz wave control process unit 731 relates to an operation of the THz wave transceiver 1, in particular, the transmission controller 13 illustrated in FIG. 3. The camera control process unit 732 relates to an operation of the camera controller 1432 for the front side camera 143 or the camera controller 1442 for the rear side camera 144 illustrated in FIG. 3. The analysis process unit 733 relates to an operation of the analysis unit 2 illustrated in FIG. 3. The visualization process unit 734 and the gas visualization application software unit 735 correspond to the visualization unit 4 illustrated in FIG. 3.

After being activated, the gas visualization application software unit 735 is configured to manage a user interface, as well as call the THz wave control process unit 731, the camera control process unit 732, the analysis process unit 733, and the visualization process unit 734 to perform analysis and visualization of gas and smell.

The SD memory 74b is configured to store such as application data, and transmit and receive the data to and from the CPU 71 through the SD I/F 74a. The communication I/F 75 is a communication interface such as 3G or 4G mobile communication or a wireless LAN, and is connected to such as a server (not illustrated) via the Internet. The controller 7 may make the server execute a part of the program to be executed to reduce its own processing load.

The graphic processor 76 is configured to generate an image to be displayed on a display screen of the touchscreen display 45a based on application data generated by the program. The graphic processor 76 also obtains camera image data captured by the camera 3 to display it. The touchscreen display 45a includes a touch screen as a user input operation unit, in addition to the display screen.

The USB I/F 77 is a serial bus interface, and connected to each of the controller 7, the THz wave transceiver 1a, and the camera 3.

The THz wave transceiver 1a corresponds to the THz wave transceiver 1 according to the first embodiment to which the USB I/F 16 is further mounted. The USB I/F 16 transmits and receives data with the USB I/F 77 of the controller 7. At this time, for example, it may be configured to digitize a detected envelope and transmit and receive it, instead of transmitting and receiving a reception signal of the THz wave.

FIG. 10 illustrates an application example of the THz wave detection equipment 100a according to the second embodiment. THz wave detection equipment 100b illustrated in FIG. 10 is integrally configured, for example, such that the THz wave transceiver 1 and the camera 3 are incorporated in the THz wave detection equipment 100a or attached in close contact with the THz wave detection equipment 100a. The THz wave detection equipment 100b includes an opening 31a of the camera 3 and an antenna 14a of the THz wave transceiver 1. The THz wave detection equipment 100b also incorporates a controller 7a therein.

The THz wave detection equipment 100b is communicatively connected to a server 92 via a communication base station 90 through the Internet 91 by transmitting and receiving a communication signal 75a therebetween.

The server device 92 can execute a part of the program to be executed by the controller 7 to reduce processing load of the controller 7a. For example, the server device 92 may be configured to be notified of the frequency f1 of the absorption spectrum, identify the type of gas corresponding to the frequency f1 by using a database in the server device 92, and return a result of identification to the controller 7a.

Alternatively, the server device 92 may be configured to receive the depth image 51 and the camera image 54 to recognize a characteristic portion of the background image.

In addition, the server device 92 may be configured to identify the level of danger with respect to an alert issued by the controller 7a, and send a notification to the police and/or the fire department, while making the controller 7a propose a concrete idea for an evacuation instruction.

As described above, according to the second embodiment, it is possible to realize gas and smell visualization equipment by utilizing a general-purpose information device.

Third Embodiment

Figure 11A:
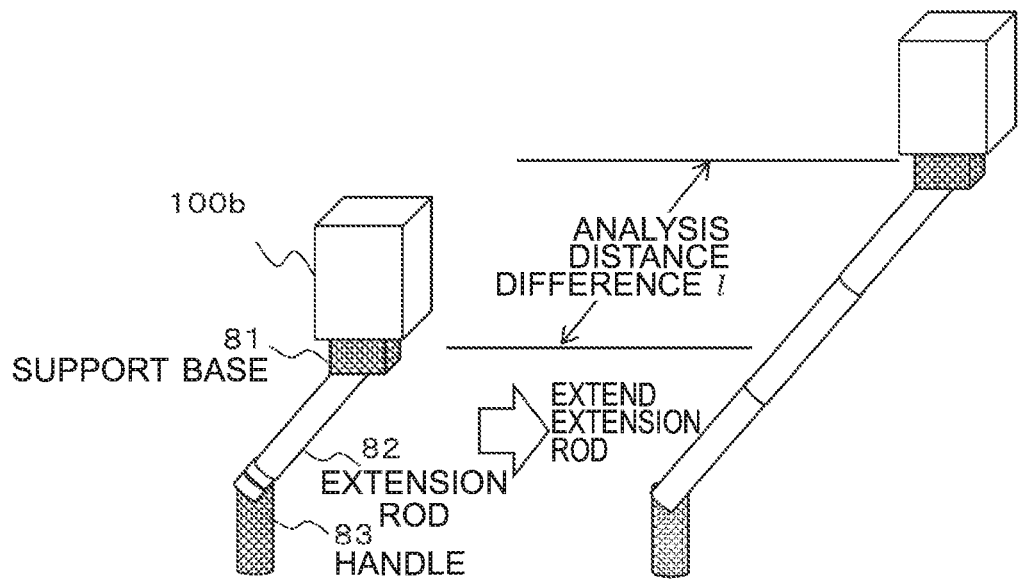
FIG. 11A illustrates distance relationship between THz wave detection equipment and gas to be analyzed.
Figure 11B:
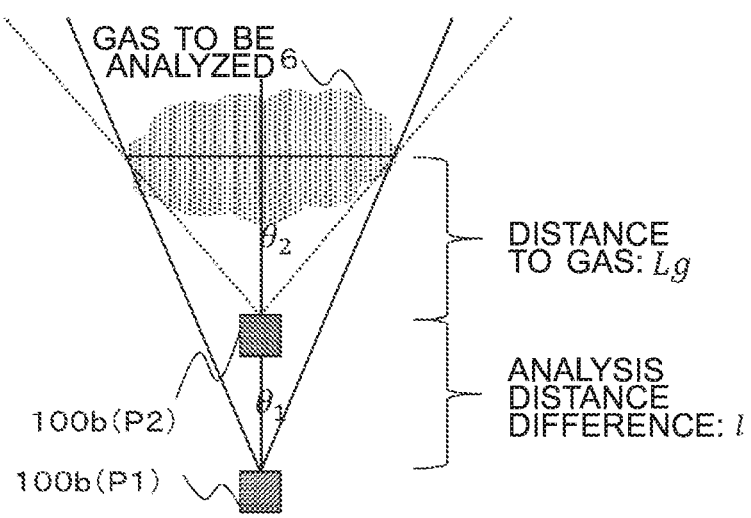
FIG. 11B illustrates distance relationship between THz wave detection equipment and gas to be analyzed.
Figure 12:
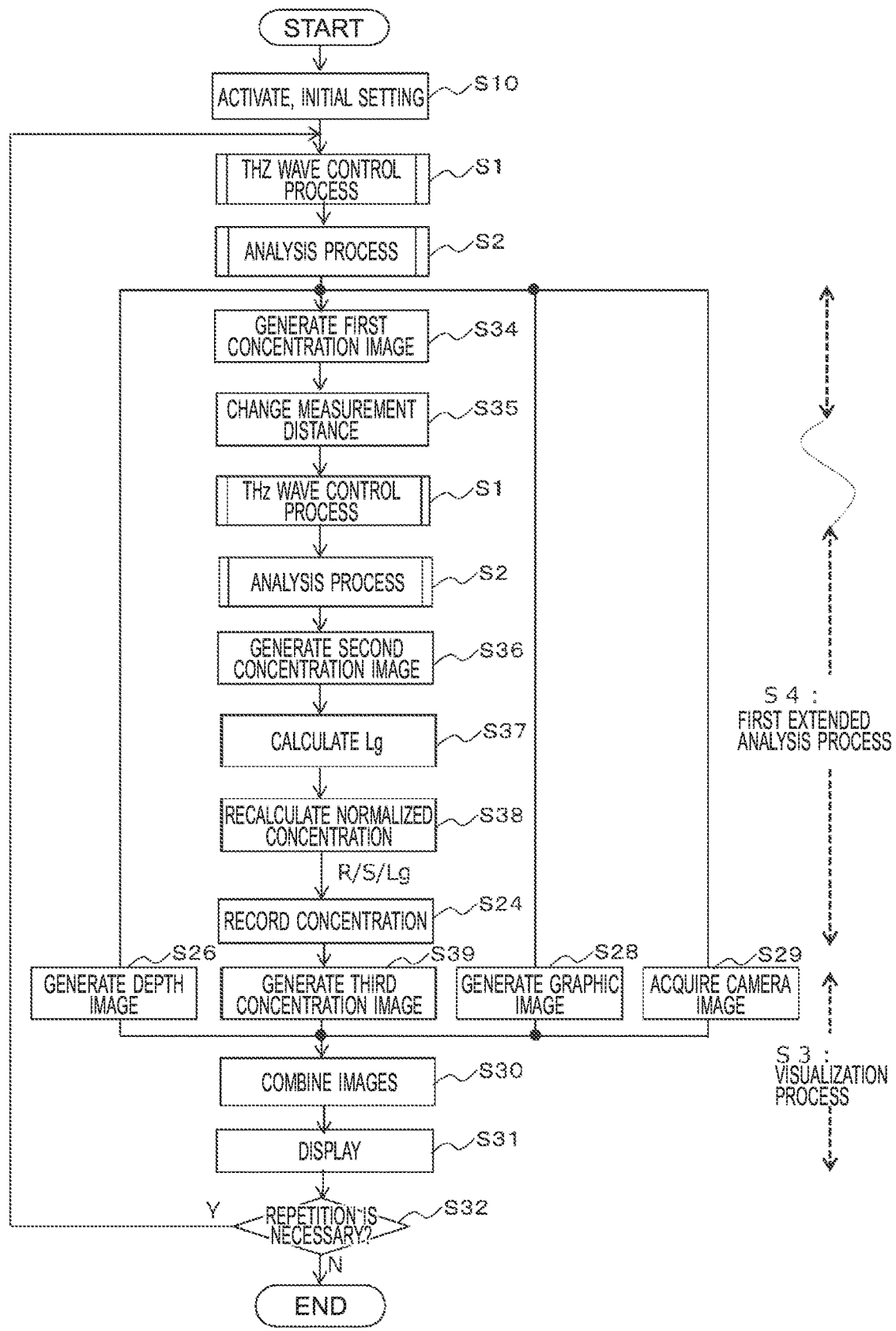
FIG. 12 illustrates a flowchart of a processing flow of THz wave detection equipment according to a third embodiment, particularly processing by a gas visualization application software unit.

With reference to FIG. 11A, FIG. 11B, and FIG. 12, a third embodiment will be described. The technical feature of the THz wave detection equipment according to the third embodiment can be found in a function of measuring a distance to gas.

FIG. 11A illustrates distance relationship between the THz wave detection equipment 100b and the gas 6 to be analyzed.

An extension device 80 illustrated in FIG. 11A includes a handle 83, an extension rod 82 attached to one end of the handle 83 to be extended and retracted in a longitudinal direction thereof, and a support base 81 mounted on a distal end side of the extension rod 82 (the side opposite to the handle 83). The THz wave detection equipment 100b is fixed to the support base 81. The user grips the handle 83, adjusts the length of the extension rod 82, and measures the gas 6 to be analyzed by the THz wave detection equipment 100b attached to the support base 81 to visualize a result thereof. The distance between the THz wave detection equipment 100b and the gas 6 to be analyzed can be varied in accordance with the length of the extension rod 82. The THz wave detection equipment 100b acquires data of whether the extension rod 82 is in an extended state or a contracted state, together with the measurement data.

FIG. 11B illustrates distance relationship between the THz wave detection equipment 100b and the gas 6 to be analyzed.

In a position P1 of the THz wave detection equipment 100b, the extension rod 82 is in the contracted state, and an angle facing the gas 6 to be analyzed is θ1. On the other hand, in a position P2 of the THz wave detection equipment 100b, the extension rod 82 is in the extended state, the distance to the gas 6 to be analyzed is shorter by an analysis distance difference l than the distance in the case of P1, and an angle facing the gas 6 to be analyzed is θ2. At this time, a distance Lg to the gas 6 to be analyzed is given by Equation (3) below.

[Equation 3]

$$Lg = l\frac{\tan\theta_1}{\tan\theta_2 - \tan\theta_1} \quad (3)$$

FIG. 12 illustrates a flowchart of a processing flow of the THz wave detection equipment 100b according to the third embodiment, particularly the processing by a gas visualization application software unit 735.

After being activated, the gas visualization application software unit 735 performs initial settings (step S10), and subsequently executes the THz wave control process (step S1) and the analysis process (step S2). At this time, the extension rod 82 is in the contracted state, and a first concentration image of the gas 6 to be analyzed is generated (step S34).

Then, the user extends the extension rod 82 to change the measurement distance (step S35), and thereafter, the THz wave control process (step S1) and the analysis process (step S2) are executed again.

The visualization process unit 734 generates a second concentration image of the gas 6 to be analyzed (step S36).

The analysis process unit 733 calculates the Equation (3) to obtain the distance Lg to the gas (step S37).

The analysis process unit 733 recalculates the normalized concentration R/S/Lg (step S38)

The analysis process unit 733 records the normalized concentration R/S/Lg (step S24), and obtains a third concentration image (step S39). The steps S34 to S38 are included in a first extended process S4 which is an extension process of the analysis process S2.

The visualization process unit 734 generates, in addition to the third concentration image (step S39), the depth image 51 (step S26), the graphic image 53 (step S28), and the camera image 54 (step S29). Then, the image composite processing (step S30) is performed by using the third concentration image and at least one of the depth image 51, the graphic image 53, and the camera image 54 to display the composite display image 55 (step S31). When the repetition condition is satisfied (step S32/Yes), a series of processes is repeated, and when the repetition condition is not satisfied (step S32/No), the processing is terminated.

As described above, according to the third embodiment, at the time of normalizing the gas concentration, the distance Lg to the gas to be analyzed is used instead of the reflection distance d to the background reflected object. As a result, the level of danger, etc. represented by the normalized gas concentration becomes more accurate.

Fourth Embodiment

Figures 13A, 13B:
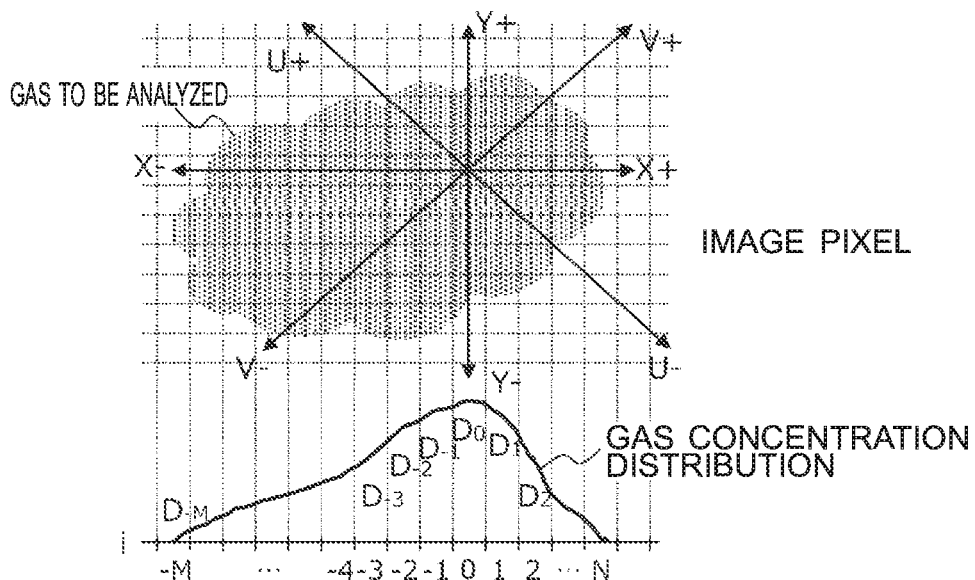
FIG. 13A explains characteristic amounts representing temporal change in a concentration distribution of gas to be analyzed.
FIG. 13B illustrates an example of a concentration distribution diagram.

With reference to FIG. 13A to FIG. 15A, a fourth embodiment will be described. FIG. 13A explains characteristic amounts representing temporal change in a concentration distribution of the gas 6 to be analyzed. FIG. 13A illustrates the distribution of the gas 6 to be analyzed in the two-dimensional area, and the concentration distribution is evaluated by four directions of X+ and X− axes, Y+ and Y− axes, V+ and V− axes, and U+ and U− axes with a point having a peak value of the concentration as reference.

FIG. 13B illustrates an example of the concentration distribution. The concentration distribution illustrated in FIG. 13B is an example of the X+ and X− axes, in which a concentration analysis value takes D1, D2, . . . in the X+ direction and takes D−1, D−2, . . . in the X− direction, with a concentration peak value D0 being set as 0 point.

S in FIG. 13B ( shows an axial direction such as X+ or X−) is a value for evaluating a level of spread of the concentration distribution illustrated in FIG. 13A, and is obtained by Equation (4) below. Evaluation of spread is performed for each of X+ and X−.

[Equation 4]

$$S_{x+} = \sum_{i=0}^{N} i^{\wedge}2 \cdot D_i / D_0$$
$$S_{x-} = \sum_{i=0}^{-M} i^{\wedge}2 \cdot D_i / D_0$$
(4)

FIG. 13B illustrates a table in which values, at the present time t1, of a coordinate value of a peak concentration value, a peak concentration value, and spread evaluation values $S_{x-}$, $S_{x+}$, $S_{y-}$, $S_{y+}$, $S_{u-}$, $S_{u+}$, $S_{v-}$, $S_{v+}$, and values, at the previous time t0, thereof are recorded, and temporal change evaluation values of spread of the gas concentration distribution are calculated in the right column.

Figure 14:
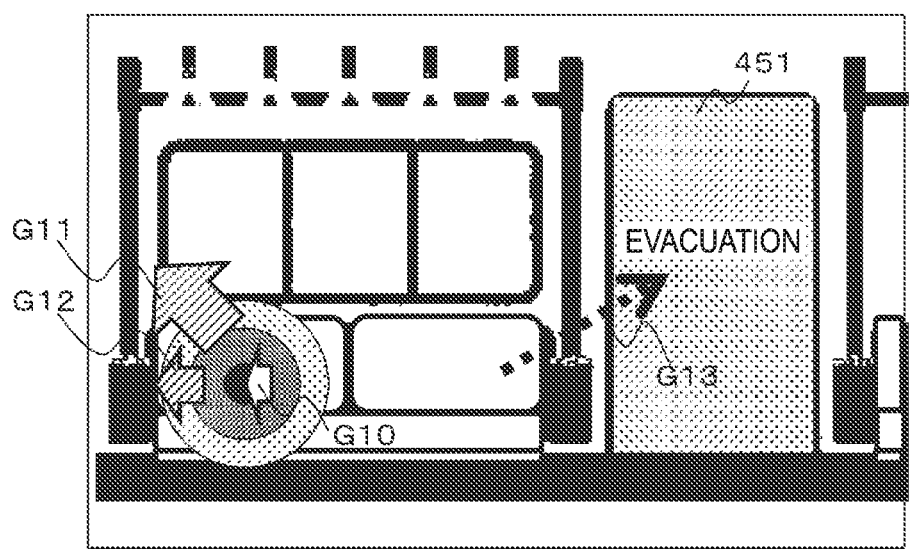
FIG. 14 illustrates a composite image.

FIG. 14 illustrates a composite display image 553 to be displayed in the present embodiment. In the composite display image 553, graphic images which allow the spread of the distribution to be easily seen are superimposed on the composite display image 55 (see FIG. 6) of the first embodiment. The composite display image 553 is obtained by superimposing G10, G11, G12, and G13 on the composite display image 55. Here, G10 represents change in the concentration peak coordinates (R, φ), and G11 and G12 represent values having large change amounts, which have been selected among the temporal change evaluation values of $S_{x-}$ to $S_{v+}$. The size of each arrow of G1, G2, and G3 corresponds to each evaluation value. The temporal change of spread of gas above is used for prediction of a dangerous area, and advice for an evacuation direction is given by displaying G13.

Figure 15:
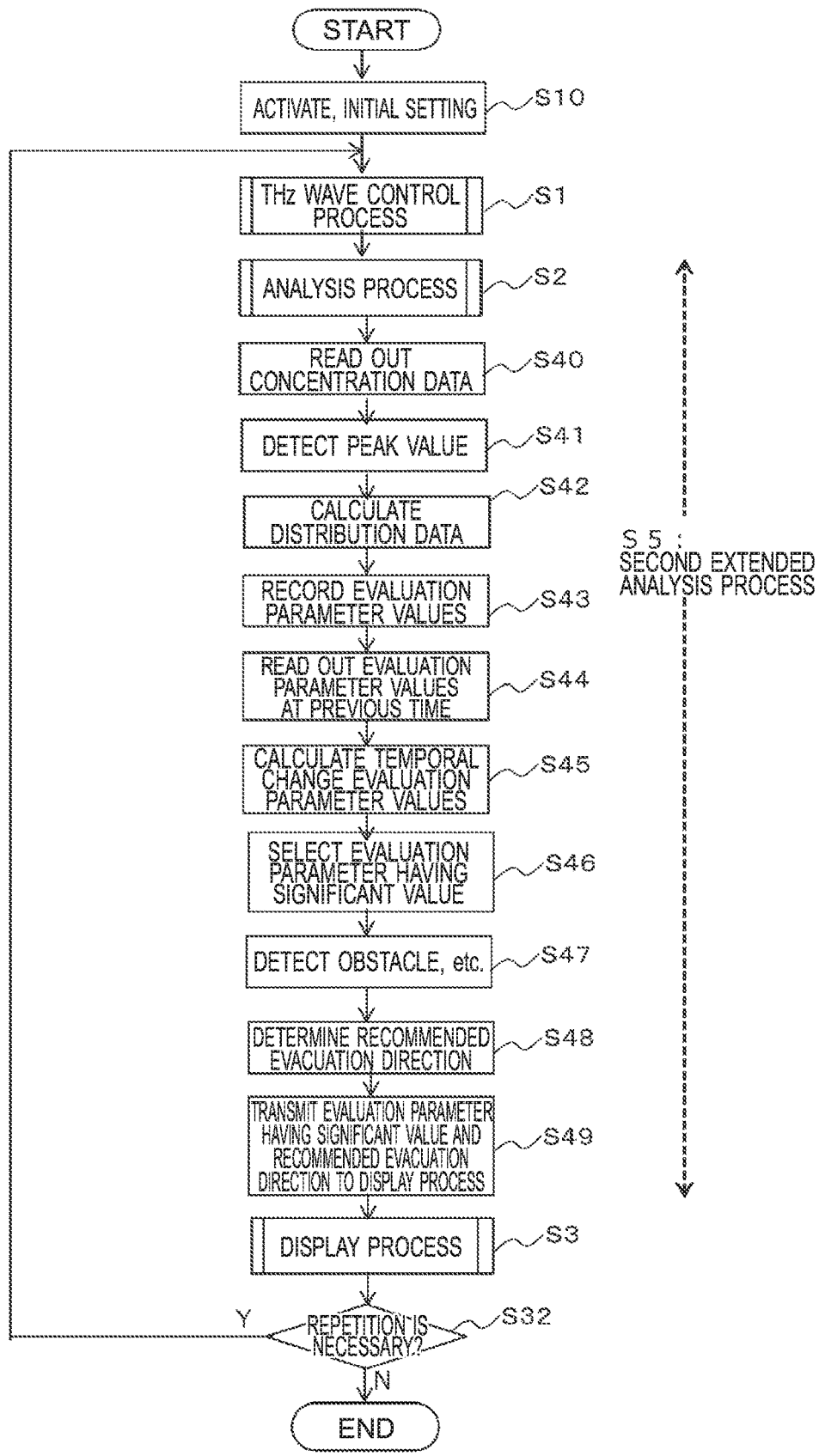
FIG. 15 illustrates a flowchart of a processing flow of a gas visualization application software unit according to a fourth embodiment.

FIG. 15 illustrates a flowchart of a processing flow of the gas visualization application software unit 735 according to the fourth embodiment. After being activated, the gas visualization application software unit 735 performs initial settings (step S10), and subsequently executes the THz wave control process S1 and the analysis process S2.

The gas visualization application software unit 735 reads out the recorded concentration data (step S40) to detect a position where the concentration has a peak value (step S41). In the case of analyzing a plurality of types of gas, the gas visualization application software unit 735 performs the steps above for each type of gas.

Next, the gas visualization application software unit 735 calculates values of evaluation parameters such as spread of the distribution (step S42) and records the calculated values (step S43).

The gas visualization application software unit 735 reads out values of evaluation parameters such as spread of the distribution at the previous time (step S44) to calculate temporal change of for the parameters (step S45). The gas visualization application software unit 735 selects an evaluation parameter having significant temporal change (step S46).

The gas visualization application software unit 735 detects an exit, an obstacle on an evacuation route, or both of them based on the background image (step S47) to determine recommendation of an evacuation direction (step S48). The steps S40 to S49 are included in a second extended analysis process S5 which is an extension process of the analysis process S2.

The gas visualization application software unit 735 transmits the evaluation parameter having the significant value and the evacuation direction to the display process S3 (step S49).

The gas visualization application software unit 735 generates the composite display image 553 illustrated in FIG. 14, and displays the generated composite display image 553 on the display 141 (step S3). Then, when the processing is determined not to be continued in step S32, the processing is terminated.

As described above, according to the fourth embodiment, evaluation values corresponding to the temporal change of the gas concentration distribution are calculated to predict temporal change of a dangerous area, and accordingly, it is possible to display an instruction of an effective evacuation route, etc. in the composite image.

Fifth Embodiment

Figure 16A:
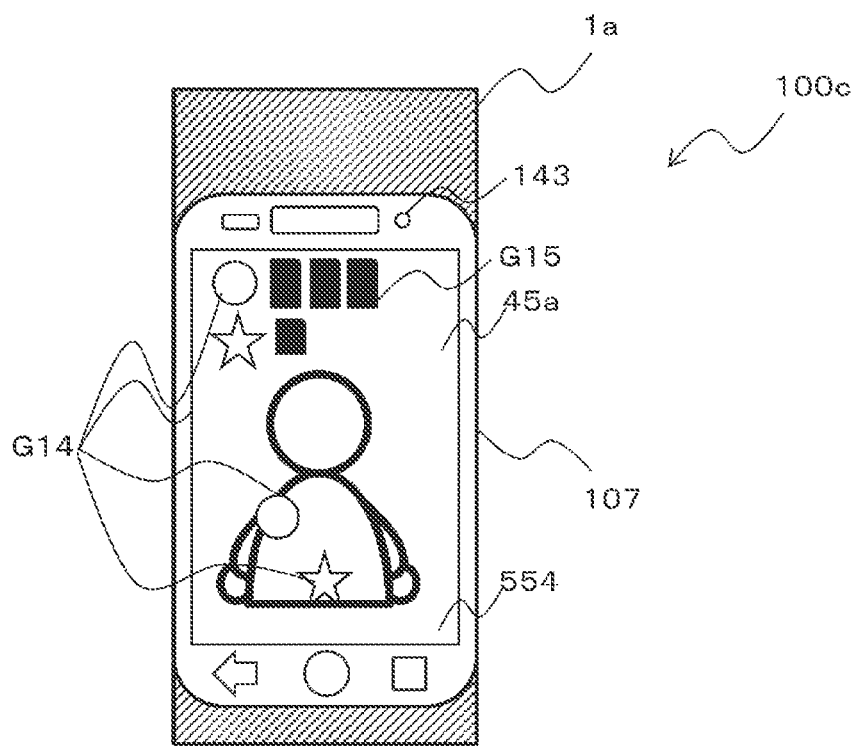
FIG. 16A is a front view of THz wave detection equipment according to a fifth embodiment.
Figure 16B:
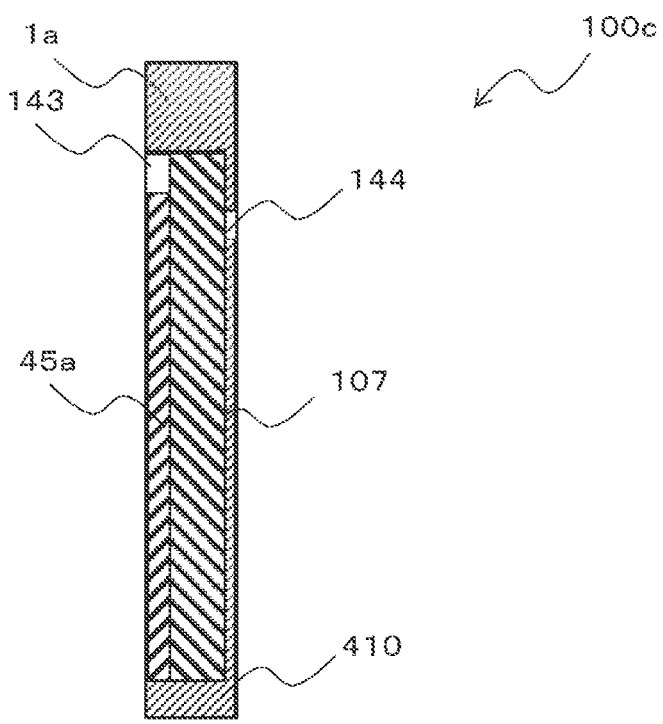
FIG. 16B is a side cross-sectional view of THz wave detection equipment according to the fifth embodiment.
Figure 17:
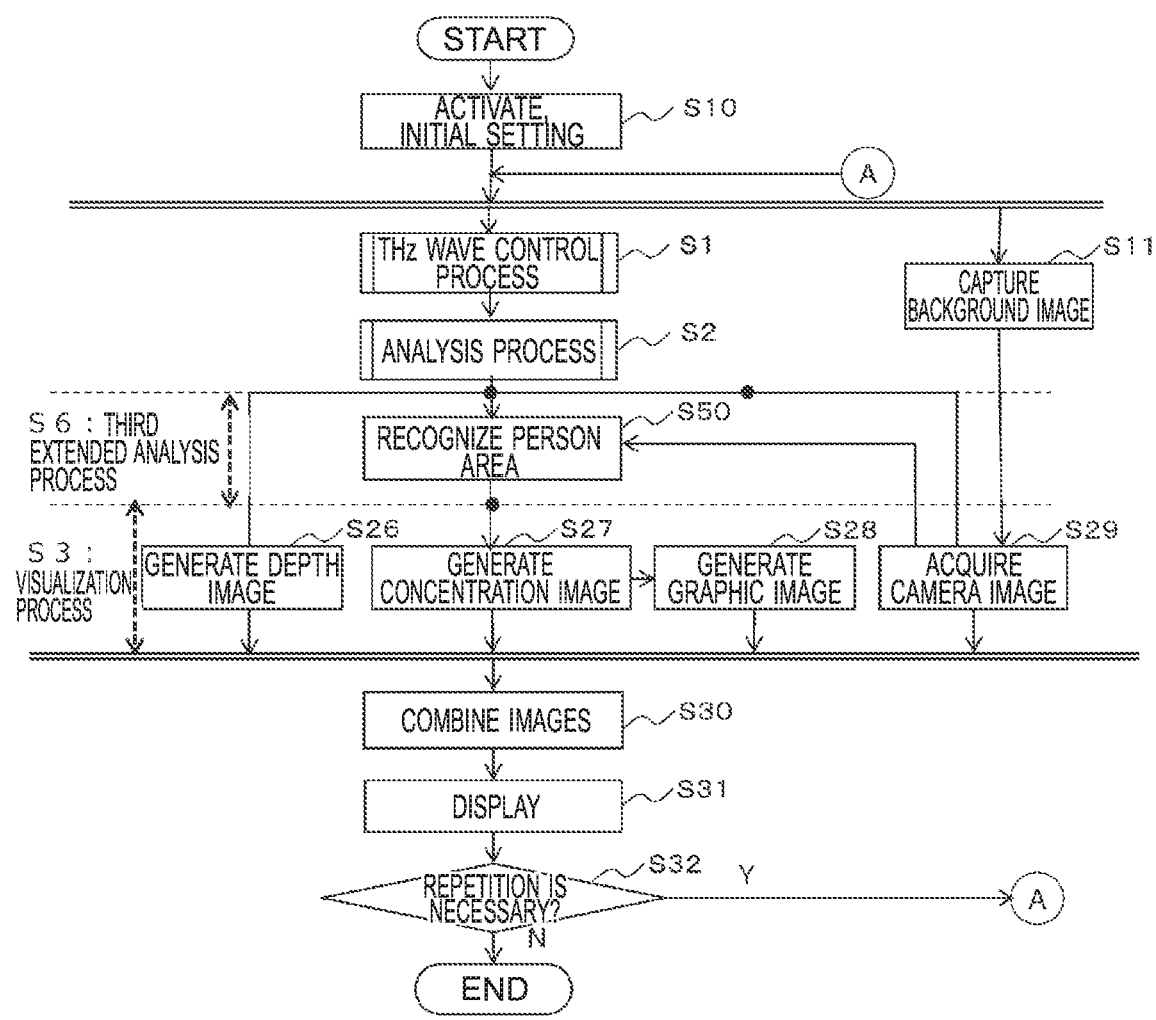
FIG. 17 illustrates a flowchart of a processing flow of a gas visualization application software unit according to the fifth embodiment.

With reference to FIG. 16 and FIG. 17, a fifth embodiment will be described. FIG. 16A is a front view of THz wave detection equipment 100c according to the fifth embodiment. FIG. 16B is a side cross-sectional view of the THz wave detection equipment 100c according to the fifth embodiment.

The THz wave detection equipment 100c illustrated in FIG. 16A includes a THz wave transceiver 1a which is accommodated in a housing cover 410 to cover the controller 7. The THz wave detection equipment 100c is configured to analyze the smell of the user while capturing an image of the user himself or herself by the front side camera 143. The THz wave detection equipment 100c is used to detect the ingredients of fragrance contained in, for example, laundry softener so as to assist for paying attention not to disturb the people around the user.

The THz wave detection equipment 100c includes a touchscreen display 45a. An image of the user is displayed on the touchscreen display 45a, and marks G14 are superimposed on the image of the user. Each shape of the marks G14 corresponds to causes of the smell registered in advance, respectively, and the level of the smell is indicated by the number of horizontal bars G15 at the top of a screen.

FIG. 17 illustrates a flowchart of a processing flow of the gas visualization application software unit 735 according to the fifth embodiment. After being activated, the gas visualization application software unit 735 performs initial settings (step S10), and subsequently executes the THz wave control process S1 and the analysis process S2.

The gas visualization application software unit 735 recognizes a person area from a camera image received from step S29 (step S50) to generate a concentration image of the person area (step S27). The gas visualization application software unit 735 generates graphic images by using the concentration image (step S28) to create such as the marks G14 illustrated in FIG. 16A (step S29).

The gas visualization application software unit 735 performs image composite processing to generate a composite display image 554 (step S30), and displays the composite display image 554 on the touchscreen display 45a (step S31). Then, when the processing is determined not to be continued in step S32, the processing is terminated.

As described above, according to the fifth embodiment, it is possible to easily analyze the smell of the user himself/herself by utilizing a camera unit of a smartphone, which is provided for self-photographing, etc.

The present invention is not limited to each of the embodiments described with reference to FIG. 1 to FIG. 17, and a part of the configuration in one embodiment can be replaced with that in the other embodiments. It is also possible to add the configuration of one embodiment to the other embodiments. All the modifications described above belong to the scope of the present invention. Furthermore, numerical values, messages, etc. appearing in the text and drawings are merely examples, and the effects of the present invention are not impaired even if different ones are used.

A part or all of the functions of the present invention may be implemented by hardware, for example, by designing them with an integrated circuit. They may be implemented by software by executing an operation program by the microprocessor unit, a CPU, etc. In addition, the scope of software implementation is not limited, and hardware and software may be used in combination.

In the embodiments above, an object to be detected is the gas 6 to be analyzed, and the background reflected object is a scene in the real space where the gas 6 to be analyzed floats, which is for example, a space in a vehicle and a structure in a living room. Meanwhile, the THz wave detection equipment 100 may be used as detection equipment at product shipment. In this case, a background reflected object is a product and the object to be detected is a foreign substance in the product, and the THz wave detection equipment 100 may be used to detect the foreign substance mixed in such as a food. The THz wave detection equipment 100 may be used as detection equipment for detecting contamination of a foreign substance into a non-food product, such as a tire. The THz wave detection equipment 100 may be used as pharmaceutical shipping detection equipment for coating inspection of multilayer coated chemical. The THz wave detection equipment 100 may be used in a baggage inspection station of such as an airport so as to specify a content of a PET bottle or a content in a suitcase without unlocking it.

REFERENCE SIGNS LIST

1: THz wave transceiver
2: analysis unit
3: camera
4: visualization unit
5: background reflected object
6: gas to be analyzed
7: controller
10: smartphone
11: transmitter
12: receiver
13: transmission controller
14: antenna
15a: transmission wave
15b: reflected terahertz wave
45a: touchscreen display

The invention claimed is:

1. Terahertz wave detection equipment comprising:
a terahertz wave transceiver including a transmitter configured to transmit a terahertz wave and a receiver configured to receive a reflected terahertz wave reflected by a background object which exists behind an object to be analyzed;
a display; and
an information processing apparatus connected to each of the terahertz wave transceiver and the display,
wherein
the transmitter irradiates a terahertz wave based on a transmission signal including a specific frequency toward a two-dimensional area including the object,
the information processing apparatus includes:
an analysis unit configured to analyze a concentration of the object based on the reflected terahertz wave; and
a visualization unit configured to generate a composite image in which a concentration image showing a concentration distribution of the object is combined with a background image of the background object based on an analysis result of the analysis unit, and display the composite image on the display, and
the visualization unit is further configured to generate a graphic image showing a change of the concentration distribution of the object over time, and superimpose the graphic image on the composite image on the display.

2. The terahertz wave detection equipment according to claim 1, wherein
the transmitter irradiates a terahertz wave based on a transmission signal in which a frequency is swept,
the analysis unit includes:
a frequency deference detection unit configured to detect a frequency difference between a frequency of the terahertz wave transmitted by the transmitter and a frequency of the reflected terahertz wave received by the receiver;
a reflection distance calculation unit configured to calculate a reflection distance from the terahertz wave transceiver to the background object based on the frequency difference;

a normalized concentration calculation unit configured to calculate a normalized concentration of the object which has been normalized by a distance based on a level of the terahertz wave transmitted from the transmitter, an amount of attenuation of the reflected terahertz wave relative to the terahertz wave irradiated by the transmitter, and the reflection distance; and an object identification unit configured to specify a type of the object based on a frequency attenuated in the reflected terahertz wave, and the visualization unit includes:

a concentration image generation unit configured to generate a concentration image including various display modes which differ in accordance with the normalized concentration;

a graphic image generation unit configured to generate a graphic image indicating the type of the object; and an image composition unit configured to combine the concentration image and the graphic image with the background image to generate a composite image, and display the composite image on the display.

3. The terahertz wave detection equipment according to claim 2, wherein the visualization unit further includes a depth image generation unit configured to generate a depth image including various display modes which differ in accordance with the reflection distance, and the image composition unit is further configured to use the depth image as the background image, and combine the concentration image with the depth image to generate the composite image.

4. The terahertz wave detection equipment according to claim 2, wherein the information processing apparatus is connected to a camera which captures an image of visible light to generate a camera image, and the image composition unit is further configured to use the camera image as the background image, and combine the concentration image with the camera image to generate the composite image.

5. The terahertz wave detection equipment according to claim 2, wherein the normalized concentration calculation unit is further configured to calculate the normalized concentration by an equation (1) below, where a signal level of a flat portion without absorption by the object is R, a signal level of a frequency attenuated by absorption of the terahertz wave by the object is S, and the reflection distance is d $$\text{Normalized concentration}=R/S/d \qquad (1).$$

6. The terahertz wave detection equipment according to claim 1, wherein the object is invisible gas, the concentration distribution of the object is a concentration distribution of the gas, and the composite image is an image obtained by superimposing the image illustrating the concentration distribution of the gas on the background image.

7. The terahertz wave detection equipment according to claim 2, wherein the terahertz wave detection equipment is attached to an extension device that includes a support base for supporting the terahertz wave detection equipment and an extension rod connected to the support base, the terahertz wave detection equipment measures the object a plurality of times by varying an extension amount of the extension rod, the normalized concentration calculation unit is further configured to:

calculate a maximum angle $\theta_1$ and a maximum angle $\theta_2$ obtained by each measurement of a width direction between ends of the object which is performed by the terahertz wave detection equipment;

calculate a distance Lg from the terahertz wave detection equipment to the object by an equation (2) below, where an analysis distance difference which is a difference between each of the amount of extension in each measurement is l; and calculate the normalized concentration by an equation (3) below where a signal level of a flat portion without absorption by the object is R, a signal level of a frequency attenuated by absorption of the terahertz wave by the object is S, and the distance from the terahertz wave detection equipment to the object is Lg, $$Lg=l \tan \theta_1/(\tan \theta_2-\tan \theta_1) \qquad (2)$$

$$\text{Normalized concentration}=R/S/Lg \qquad (3), \text{ and}$$

the concentration image generation unit is further configured to generate a new concentration image in which the normalized concentration is updated.

8. The terahertz wave detection equipment according to claim 1, wherein the visualization unit includes a graphic image generation unit configured to acquire a concentration distribution over a plurality of axes for each of a plurality of concentration images generated along a time-series, and obtain values of evaluation parameters corresponding to a center of the concentration distribution and spread of the concentration distribution, to generate graphic image data indicating a time-series change of the values of the evaluation parameters, and an image composition unit configured to combine the graphic image data with the background image to generate a composite image, and display the composite image on the display.

9. The terahertz wave detection equipment according to claim 8, wherein the graphic image generation unit is further configured to generate a graphic image indicating a path in a direction different from a direction of change of a position in the concentration distribution along the time series based on the time series change of the values of the evaluation parameters, and combine the graphic image with the background image to generate the composite image.

10. The terahertz wave detection equipment according to claim 4, wherein the object is a component of smell, the object identification unit is further configured to identify the component of the smell based on the reflected terahertz wave, the graphic image generation unit is further configured to generate a graphic image indicating a type of the component of the smell as specified, and the image composition unit is further configured to specify a region of the camera image, which includes an image of a real space where the component of the smell is detected is captured, and generate a composite image in which the graphic image indicating the type of the component of the smell as specified is superimposed on the region.

11. A terahertz wave detection method comprising the steps of:

irradiating a terahertz wave based on a transmission signal including a specific frequency toward a two-dimensional area including an object to be analyzed;

receiving a reflected terahertz wave reflected by a background object which exists behind the object;

analyzing a concentration of the object based on the reflected terahertz wave;

generating a composite image in which a concentration image showing a concentration distribution of the object is combined with an image of the background object based on a result of analysis of the concentration of the object;

displaying the composite image on a display; and generating a graphic image showing that a change of the concentration distribution of the object over time, and superimposing the graphic image on the composite image on the display.

12. A terahertz wave detection system comprising:

a terahertz wave transceiver including a transmitter configured to transmit a terahertz wave and a receiver configured to receive a reflected terahertz wave reflected by a background object which exists behind an object to be analyzed;

a wearable terminal including a display; and an information processing apparatus connected to each of the terahertz wave transceiver and the wearable terminal, wherein the terahertz wave transceiver irradiates a terahertz wave based on a transmission signal including a specific frequency toward a two-dimensional area including the object, the information processing apparatus includes:

an analysis unit configured to analyze a concentration of the object based on the reflected terahertz wave; and a visualization unit configured to generate a composite image in which a concentration image showing a concentration distribution of the object is combined with an image of the background object based on an analysis result of the analysis unit, and output the composite image to the wearable terminal, and the visualization unit is further configured to generate a graphic image showing a change of the concentration distribution of the object over time, and superimpose the graphic image on the composite image.

13. A terahertz wave detection system comprising:

a terahertz wave transceiver including a transmitter configured to transmit a terahertz wave and a receiver configured to receive a reflected terahertz wave reflected by a background object which exists behind an object to be analyzed;

a wearable terminal including a transmissive display, an information processing apparatus connected to each of the terahertz wave transceiver and the wearable terminal; and a camera, wherein the terahertz wave transceiver irradiates a terahertz wave based on a transmission signal including a specific frequency toward a two-dimensional area including the object, the information processing apparatus includes:

an analysis unit configured to analyze a concentration of the object based on the reflected terahertz wave; and a visualization unit configured to generate a display image showing a concentration image of the analyzed object on an image of the background object based on an analysis result of the analysis unit, and output the display image to the wearable terminal, and wherein the transmissive display shows the display image in accordance with a background image captured by the camera.

* * * * *